United States Patent [19]
Knowlton

[11] Patent Number: 6,157,389
[45] Date of Patent: Dec. 5, 2000

[54] METHOD FOR REDUCING THE SIZE OF AN IMAGE

[75] Inventor: Kenneth C. Knowlton, Merrimack, N.H.

[73] Assignee: Kodak Limited, Herts, United Kingdom

[21] Appl. No.: 08/340,003

[22] Filed: Nov. 15, 1994

[51] Int. Cl.[7] .................................................. G06F 15/00
[52] U.S. Cl. .......................................................... 345/439
[58] Field of Search ................................... 345/439, 433, 345/202, 441, 443; 358/287, 451

[56] References Cited

U.S. PATENT DOCUMENTS

| | | | |
|---|---|---|---|
| 4,503,469 | 3/1985 | Kato | 358/287 |
| 5,323,250 | 6/1994 | Shibazaki | 358/525 |
| 5,491,769 | 2/1996 | Moller | 345/439 |
| 5,680,225 | 10/1997 | Hirabayashi | 358/451 |

OTHER PUBLICATIONS

IBM Technical Disclosure Bulletin, vol. 37, No. 11, Nov. 1994, pp. 355–356, 'Formation of Iconic Representation of Large Images'.

IBM Technical Disclosure Bulletin, vol. 32, No. 4A, Sep. 1989, pp. 194–195, 'Area Average Image Reduction'.

*Primary Examiner*—Phu K. Nguyen
*Attorney, Agent, or Firm*—Kenneth L. Muik; Ronald J. Paglierani

[57] ABSTRACT

A method is disclosed for operating a computer system to reduce the size of an image, which comprises the following steps. First, data representing an image, a size of the image, and a desired size of a corresponding compressed image is received by the system. If processing of the image is finished, then data representing the compressed image is emitted, otherwise the image is partitioned into at least one strip to omit and a plurality of subimages, each represented by data representing the subimage, a size of the subimage, and a desired size for a corresponding compressed subimage. Then the above steps are repeated for each subimage.

35 Claims, 15 Drawing Sheets

| BAND | START | END | TYPE | WEIGHT | DELETE |
|------|-------|-----|--------|--------|--------|
| B1 | 0 | 2 | BLANK | 4.5 | 1 |
| B2 | 3 | 7 | -31997 | 5 | 1 |
| B3 | 8 | 13 | BLANK | 18 | 5 |
| B4 | 14 | 16 | 16 | 3 | 1 |
| B5 | 17 | 27 | BLANK | 33 | 9 |
| B6 | 28 | 30 | 28 | 3 | 1 |
| B7 | 31 | 32 | BLANK | 3 | 1 |

METHOD FOR REDUCING THE SIZE OF AN IMAGE

The present invention relates to a method for processing binary objects, such as bitmaps, representing visual images, such as screen or scanned images, to compress them in the sense of reducing the size of the image represented by that binary object.

It is often desired to shrink an image represented by a binary object. For example, it may be desired to reduce the display size of an image representing textual data. Or it may be desired to represent a document as an icon by compressing the actual image of such a document (or first page of the document) to icon size. In both of these cases, it is desirable to maintain to the maximum extent possible the details and legibility of the compressed image formed from the full size image.

A visual image may be represented as an array of r rows by c columns of pixels (picture elements). A known method for compressing such image representative data to reduce the size of the image is decimation of the image representative data, i.e. the removal from the image array of regularly spaced rows and/or columns of pixels. For example, to reduce the size of an image by 50% horizontally and vertically, every other row of pixels is deleted, and every other pixel in the remaining rows is also deleted. Decimation is simple and fast. However, because the image structure is disregarded, details and legibility of the resulting compressed image are degraded.

The inventor has realized that often images contain areas from which image information could be omitted without degrading the detail or legibility of the image. For example, large swaths (either adjacent rows or adjacent columns) of a solid color (e.g. white or black) represent such image information. Such areas will be called blank areas in the remainder of this application. The inventor has further realized that by preferentially deleting pixels from such areas, the size of an image may be reduced, while maintaining the details and legibility of the original image. Only when blank areas are no longer available, but further size reduction is required, will the other areas, called occupied areas in the remainder of this application, be reduced in size.

In accordance with principles of the present invention, a computer system is operated to reduce the size of an image according to a method comprising the following steps. First, data representing an image, a size of that image, and a desired size for the compressed image is received by the system. If processing of the image is finished, then data representing the compressed image is emitted, otherwise the image is partitioned into a plurality of subimages, each specified by data including data representing the subimage, a size of the subimage, and a desired size for a corresponding compressed subimage. Then the above steps are repeated for each subimage.

Figure 1:
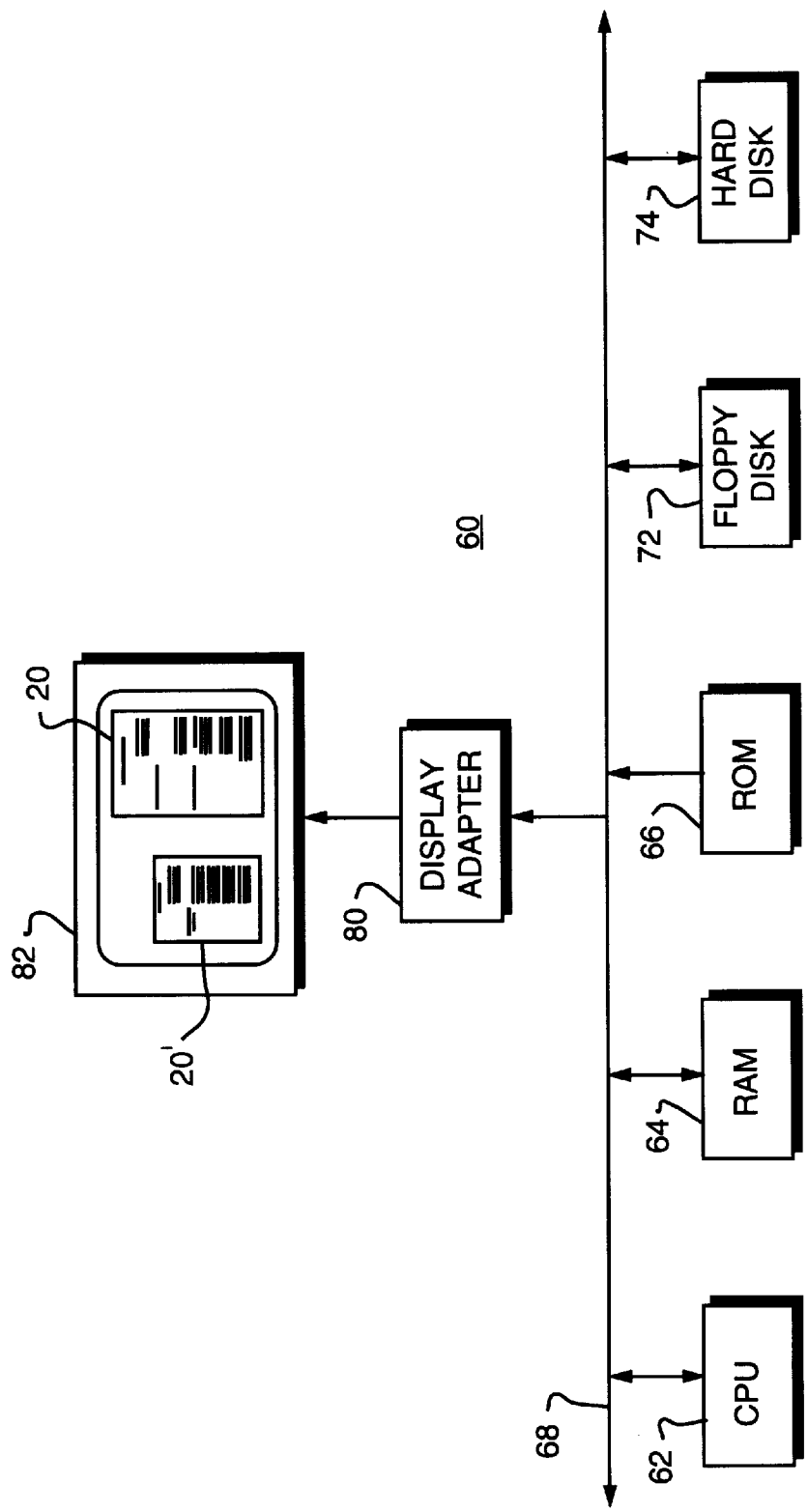
FIG. 1 is a block diagram of a computer system on which the compression method according to the present invention may be practiced.

FIG. 1 is a block diagram of a computer system 60 on which the compression method according to the present invention may be practiced. In FIG. 1, a central processing unit (CPU) 62, a read/write memory (RAM) 64 and a read only memory (ROM) 66 are coupled together in a known manner via a system bus 68. A display device 82 is coupled to the system bus 68 through a display adapter 80, and a floppy disk storage system 72 and hard disk storage system 74 are both also coupled to the bus 68, also in a known manner. Other elements (not shown) may also be included in the computer system 60, such as keyboards, and other storage and/or input/output devices.

In operation, the CPU 62 executes programs stored in the RAM 64 and/or ROM 66, and operates to read data from the RAM 64, the ROM 66, the floppy disk 72, the hard disk 74 and/or other input devices (not shown); to process the data; and to write data to the RAM 64, the display adapter 80, the floppy disk 72, the hard disk 74 and/or other output devices (not shown). As a part of the programs executed by the CPU 62, graphical images are displayed on the display device 82, under the control of the display adapter 80. In general, data representing the images to be displayed on the display device 82 is stored in the RAM 64. The display adapter 80 retrieves this data, and controls the operation of the display device 82 to produce the image represented by that data on the display device 82.

An image of a page 20 is illustrated on display device 82. The image 20 may, for example, consist of lines of text, each line consisting of several words, each word consisting of several letters. Data representing this page image 20 is stored in rasterized form in RAM 64 as an array of bits having r rows and c columns, in a known manner. Each bit in the array represents a corresponding pixel in the raster, in which a black pixel is represented by a bit having a logical '1' value and a white pixel is represented by a bit having a logical '0' value. Also illustrated on the display device 82 is a reduced-sized image 20' of the page image 20.

To visually compress the image 20, the CPU executes a program, described in more detail below, which takes as input image representative data which includes two components. The first component is the image array stored in the RAM 64, described above. The second component, called the image specification in the remainder of this application, is data specifying: the location and boundaries in the image array of the image to be compressed (e.g. a top row, bottom row, left-hand column and right-hand column of the portion of the data array containing the data representing the image to be compressed); the respective numbers of pixels to be deleted from each row and each column of the specified image to generate a compressed image having the desired size; and other data to be described in more detail below. In this way, the complete image represented by the image array, or any specified portion of it, can be visually compressed. The program produces data from which the compressed image may be constructed.

For example, in the illustrated embodiment, an image stored in one image array, referred to below as the source image array, is visually compressed to generate a compressed image stored in a second image array, similar to the source image array and referred to below as the destination image array. In the illustrated embodiment, included in the image specification data is a location (e.g. a top row and left-hand column) in the destination array at which the data representing the compressed image is to be placed.

Although a black and white image is illustrated, a color image could also be compressed using the method according to the present invention. As a part of this compression process, such a color image could be translated into a similar array of bits, each bit representing a pixel, in which a pixel of a background color is represented by a bit having a logical '0' value, and a pixel of any other color is represented by a bit having a logical '1' value. This bit array is processed in the same manner as the array described above representing a black and white image to produce the reduced size image. Further, as described above, during the compression process, the image may be divided into subimages. A different color may be designated as the background color for each respective subimage during the translation of that subimage into a corresponding array of bits. The translation of the color image into a bit array is for the purposes of visual compression only. A color image compressed in this manner will remain a color image having the same colors as the original.

Figure 2:
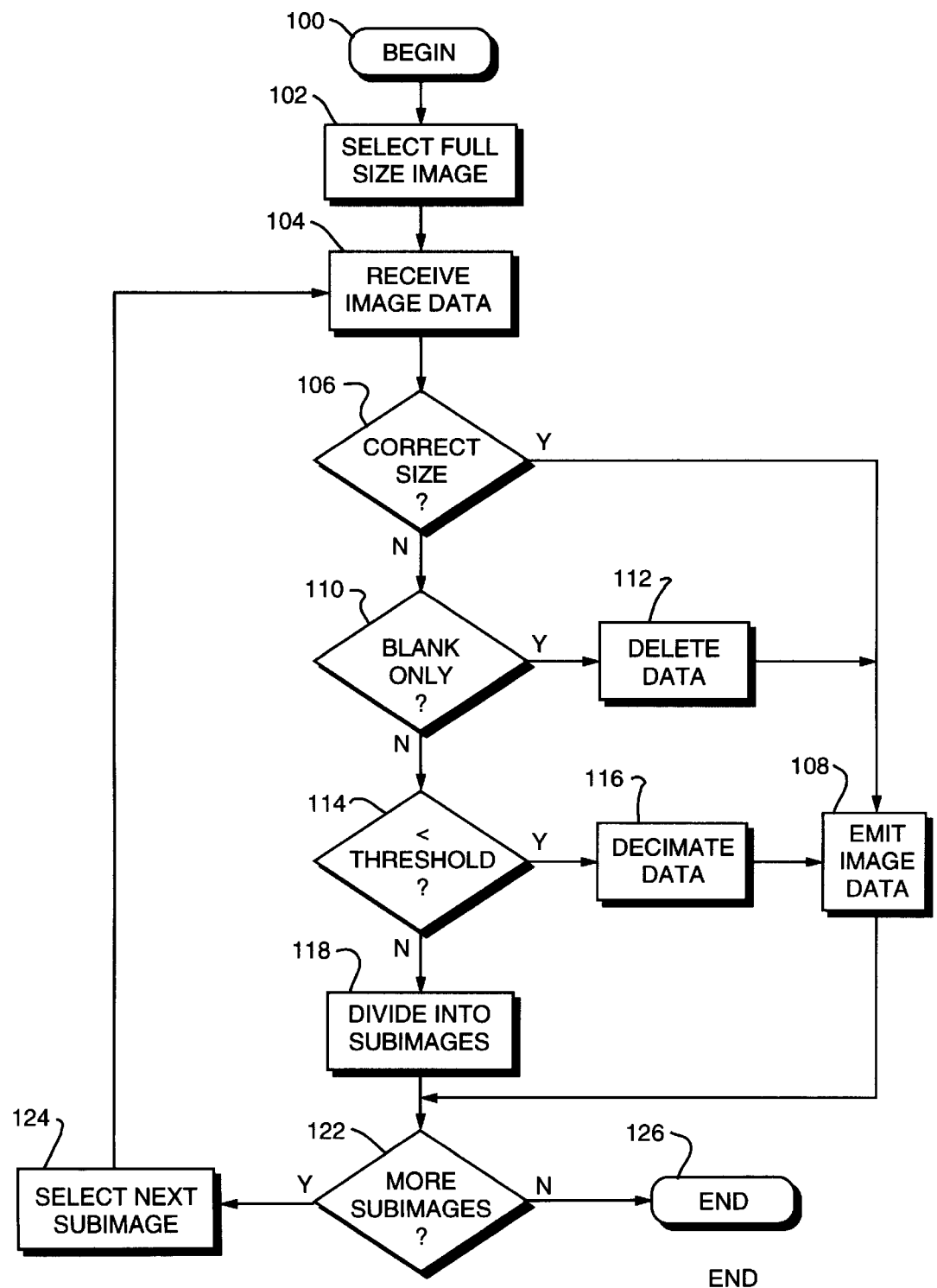
FIG. 2 is a flow diagram illustrating a method of compressing an image in accordance with the present invention.

FIG. 2 is a flow diagram illustrating a method of compressing an image in accordance with the present invention. The processing illustrated in FIG. 2 takes the portion of the source image array defined by the image specification data, consisting of r rows and c columns of pixels, and deletes a number of pixels defined in the image specification data from each column of pixels such that the compressed image has $r_d$ rows, and a number of pixels defined in the image specification data from each row of pixels such that the compressed image has $c_d$ columns of pixels. The method illustrated in FIG. 2 begins at step 100, where any required initializations are performed. In step 102, the image specification data representing the image to be compressed (described above) is selected. For example, a pointer may be set to point to such data, or the data may be retrieved from the top of a stack, onto which it was pushed during the initialization step 100. In step 104, this image specification data is retrieved from the selected location, e.g. the image specification data is popped off the top of the stack.

The image specification data, thus retrieved, is first analyzed to determine whether the image may be considered finished. An image is considered finished when only relatively trivial processing remains to be performed. Steps 106 to 116 perform this analysis and also the relatively trivial processing required, if the retrieved image is considered finished. If the image is not considered finished, then further processing, described in detail below, is performed.

In step 106, the size of the image being processed is compared to the desired size for the compressed image, e.g. the respective numbers of pixels to be deleted from the rows and columns of the image are checked. If no pixels are to be deleted from either rows or columns, then the size of the image being processed is the desired size of the compressed image, no further processing of the image is required, and data representing the image is emitted in step 108 to subsequent processing (not shown). The emitted data may, for example, include image array data in the source image array representing the compressed image, and corresponding image specification data including the size of the compressed image, and a location in the destination image array for this image array data. Subsequent processing may, for example, assemble the compressed image by transferring the image array data to the specified location in the destination array, and display the assembled compressed image on the display device 82 (of FIG. 1) or store it in a mass storage device such as the floppy disk 72 or hard disk 74.

In step 110, the source image array data representing the image being processed, as defined by the image specification data, is checked to determine whether it represents a blank area, i.e. a solid color, as described above. One method for determining if the image array data representing the image being processed represents a blank area is to analyze each pixel representative bit in the source image array in a manner to be described in more detail below. If all the bits have the same logical value, then the image is either solid black (all '1' bits) or solid white (all '0' bits). In either case, the image has no visual detail, either vertically or horizontally, and the required pixels may be deleted from rows and columns anywhere within the image, which is a relatively trivial process. If in step 110 it is determined that the image is blank, then the required data is deleted in some manner in step 112. For example, rows could be deleted from the bottom of the image, and columns could be deleted from the right-hand side of the image. Data representing the resulting image, which has the desired size, is then emitted in step 108, as described above.

In step 114 the size of the image being processed, as defined in the image specification data, is compared to a threshold size. For example, the area of the image (r×c) may be compared to a number A, representing a threshold area; or the dimensions of the image, i.e. r and c, may be respectively compared to a number t, representing a threshold length. A and t may be changed dynamically during the processing illustrated in FIG. 2, and their values may be related. For example, in the illustrated embodiment, the threshold area A is the square of twice the threshold lengths t, i.e. $A=(2t)^2$. If either the area of the image (r×c) is less than A, or the length of either dimension (r or c) of the image is less than t, then the image is considered to be below the threshold size. If the size of the image is below the threshold size, then a relatively trivial decimation of the image, as described above, is performed in a well known manner in step 116 to reduce it to the desired size. Data representing the decimated image, which has the desired size, is emitted in step 108, as described above.

If the image being processed is not capable of being processed in steps 106 to 116, as described above, then it is subdivided into smaller images, sometimes termed subimages in the remainder of this application, which will all be subsequently processed in a similar manner. In step 118, the image being processed is analyzed, in a manner to be described in more detail below, to divide it into two or more subimages. Image specification data representing each resulting subimage, including: the location and size in the source image array of the subimage, the respective number of pixels to be deleted from each row and column of the subimage, the location in the destination image array (which is also stored separately) of the compressed subimage to be generated from this subimage, and other data described below; is then stored for future retrieval. For example, this data may be pushed atop a stack.

Step 122 is reached either after data representing a compressed image has been emitted in step 108, or after the image has been divided into subimages in step 118, and image specification data for each respective subimage has been pushed on the stack. In step 122, a check is made to determine whether any subimages remain to be processed. For example, if subimage specification data is kept in entries on a stack, step 122 checks to determine if the stack has any entries remaining in it. If not, then the process ends in step 126. Otherwise, in step 124, the image specification data representing the next subimage to process is selected. For example, the next subimage entry may be popped off the top of the stack. This subimage specification data is then processed by the steps 104–118 until it either is successfully compressed in steps 106–116, or it is divided into further subimages in step 118. This loop continues until all the subimages have been successfully compressed in some manner, and none remain to be processed.

Figure 3:
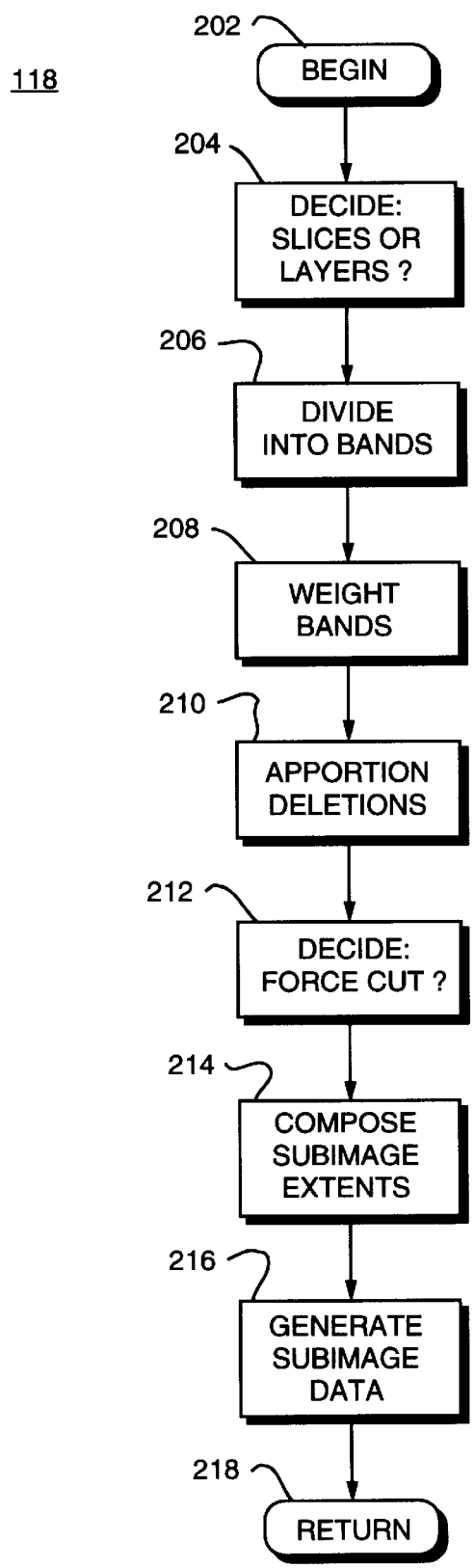
FIG. 3 is a more detailed flow diagram illustrating a portion of the method of compressing an image illustrated in FIG. 2.

FIG. 3 is a more detailed flow diagram illustrating the step 118 (of FIG. 2) of dividing the image being processed into subimages. The process of step 118 (of FIG. 2) begins in step 202 in which initial data is generated, and any required initializations are performed. Specifically, horizontal and vertical profiles of the foreground (black) pixels in the image being processed are prepared, in a manner described below, in step 202.

Figure 5:
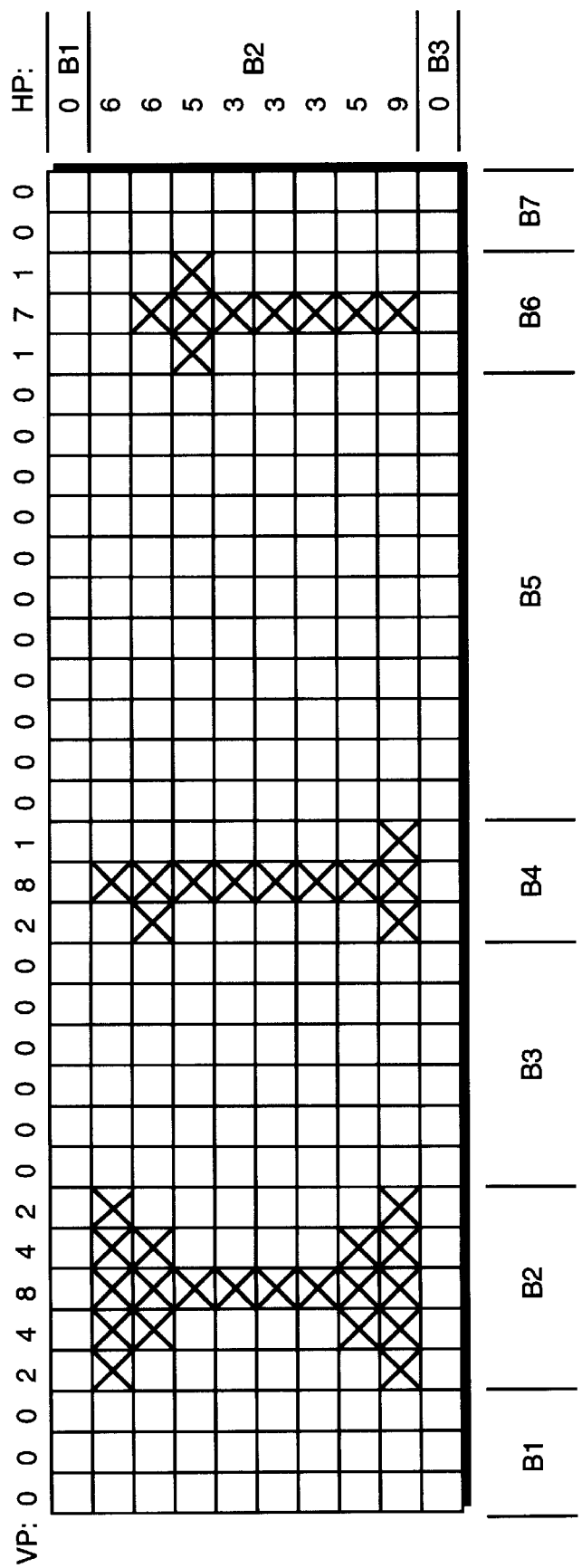
FIG. 5, FIG. 7, FIG. 9, FIG. 10 and FIG. 11 are storage diagrams illustrating rasterized image arrays useful in understanding the compression process according to the present invention.

FIG. 5 is a storage diagram of a source image array of bits representing a rasterized image which is useful in understanding the process illustrated in FIG. 3. In FIG. 5, a raster 10 pixels high and 33 pixels wide is illustrated, i.e. the image array of bits has 10 rows and 33 columns. Bits in the image array representing pixels are illustrated as small squares; bits representing foreground, or black, pixels are illustrated as crosses within the square, and bits representing background, or white pixels are illustrated as blank squares. The array illustrated in FIG. 5 represents an image of an "I" and a "1", followed by some blank space, and concluding with a "t". In the following description, it is desired to compress this image by 19 columns and three rows by deleting 19 pixels from each row of pixels, and 3 pixels from each column of pixels.

A vertical profile is made of the columns of the source image array by counting the number of foreground, or black, pixels in each column. The vertical profile VP is illustrated by the numbers across the top of the source image array illustrated in FIG. 5. In the three leftmost columns, there are no foreground pixels, so the counts in the vertical profile are 0. In the fourth column, there are two foreground pixels (illustrated as crosses in their blocks), so the count is 2. In the fifth column, there are four foreground pixels, so the count is 4, and so forth. Similarly, a horizontal profile is made of the rows of the source image array by counting the number of foreground pixels in each row. The horizontal profile HP is illustrated by the numbers down the right-hand side of the illustrated source image array in FIG. 5. The topmost row has no foreground pixels, so the count is 0. The second row contains six foreground pixels, so the count is 6. The third row also contains six foreground pixels, so the count is 6, and so forth.

The vertical VP and horizontal HP profiles, illustrated in FIG. 5 are further processed in step 202 (of FIG. 3) to determine the width of the widest blank slice (like a slice of bread) or the height of the tallest blank layer (like a layer of a cake) within the image. Blank slices or layers forming a margin or lying on the periphery of the image are not considered to be 'within' the image, as that term is used in this context, and are ignored in this processing. Referring to FIG. 5, in the vertical profile VP, there are two blank slices within the image: between the "I" and the "1" being 6 columns wide, and between the "1" and the "t" being 11 columns wide. The width of the widest slice within the image, thus, is 11. In the horizontal profile HP, there are no blank layers within the image—the top and bottom rows not being considered to be within the image, as described above. The height of the tallest layer within the image, thus, is 0. In an actual embodiment, the width of the widest blank slice and height of the tallest blank layer could be accumulated simultaneously with the counting of the foreground pixels in the columns and rows when profiling the image. The vertical VP and horizontal HP profiles, and the width of the widest blank slice and height of the tallest blank layer within the image will be used in steps described below.

Figure 4A:
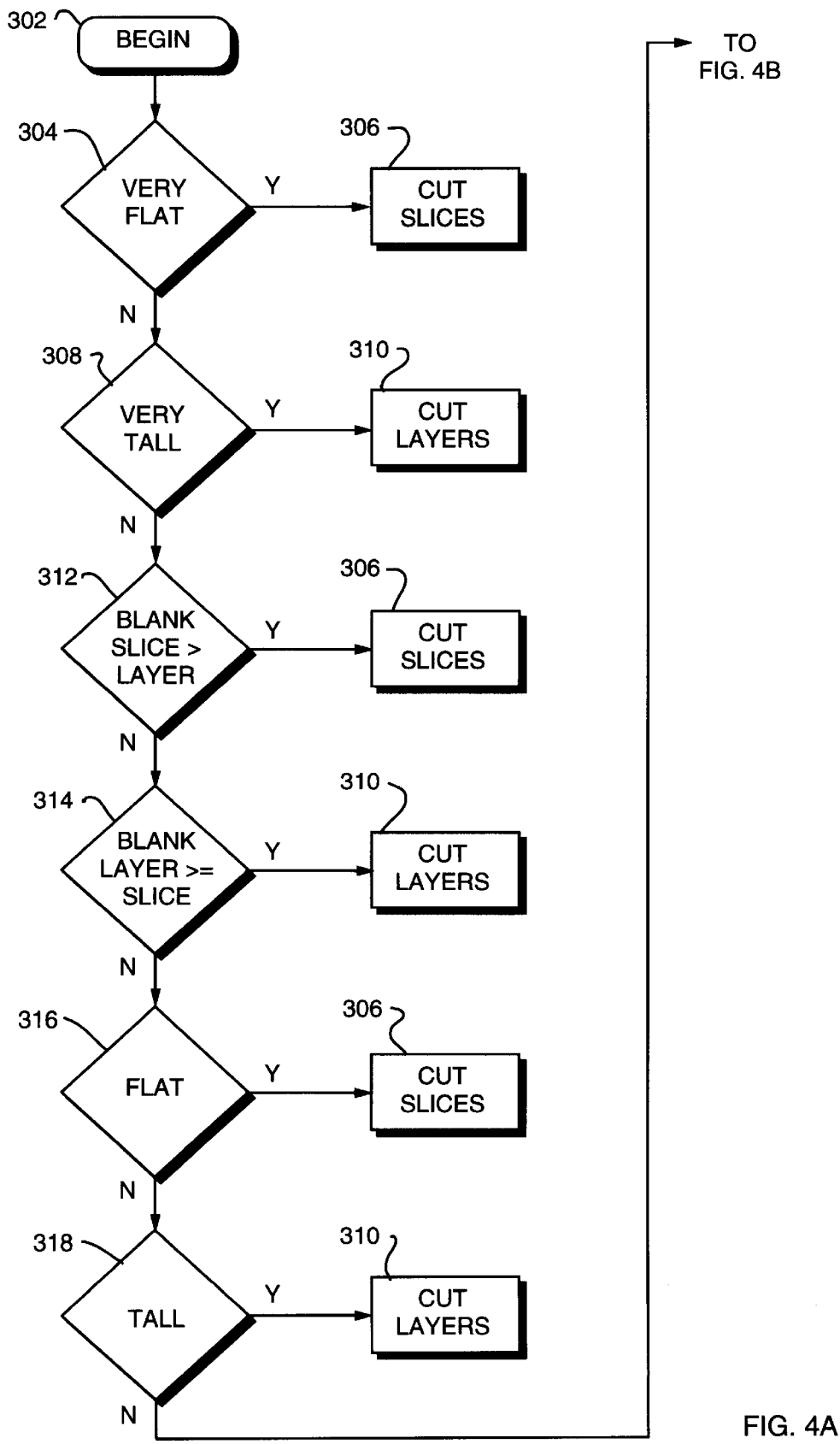
FIG. 4, FIG. 8 and FIG. 12 are more detailed flow diagrams illustrating portions of the method of compressing an image illustrated in FIG. 3.
Figure 4B:
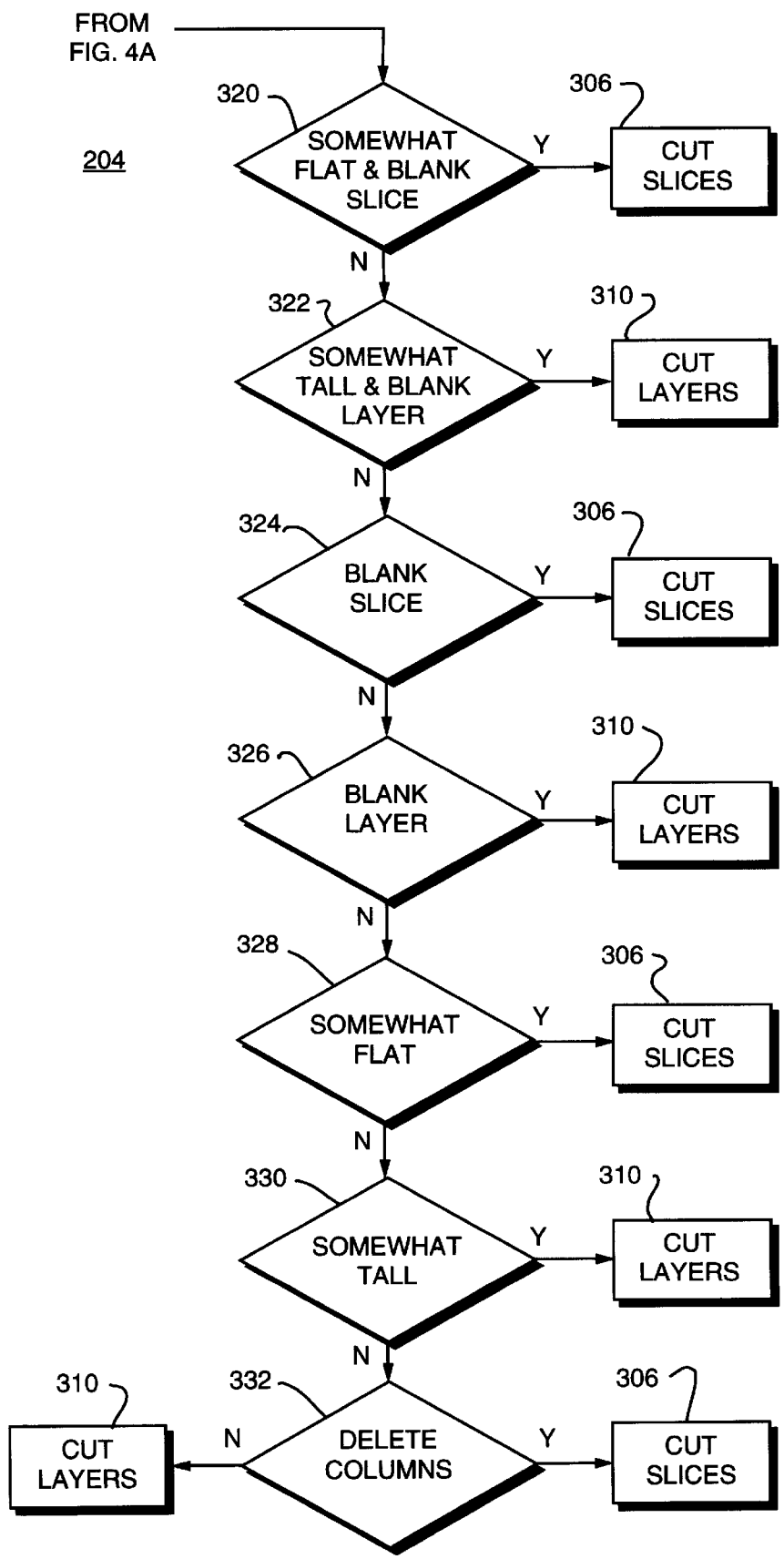

Referring again to FIG. 3, in step 204, a decision is made whether to divide the image vertically into two or more slices or horizontally into two or more layers. This decision is based on the width of the widest blank slice and the height of the tallest blank layer within the image, the aspect ratio of the image, and the respective numbers of pixels to be deleted from each of the rows and columns of the image. FIG. 4 is a more detailed flow diagram illustrating the process of step 204 (of FIG. 3) of deciding whether to divide the image into slices or layers. FIG. 4 illustrates a series of tests based upon the above criteria. One result of each test may be a decision to divide the image being processed into either slices or layers. Although not illustrated, every test to determine whether to divide the image into layers contains an additional test to determine whether any pixels are to be deleted from the columns in the image. If no such pixels are to be deleted, then there is no need to divide the image into layers and the test fails. Similarly, every test to determine whether to divide the image into slices contains an additional test to determine whether any pixels are to be deleted from the rows of the image. If no such pixels are to be deleted from rows of the image, then there is no need to divide the image into slices and the test fails.

The process illustrated in FIG. 4 begins in step 302, in which data representing the various criteria discussed above is gathered, and preliminary calculations are performed. In step 304, if the width of the image (number of columns c) is greater than four times the height (the number of rows r), i.e. c>4r, the image is termed very flat. If the image is very flat, and there are pixels to delete from rows of the image, then the decision is made to cut the image into slices in step 306. In step 308, if the height of the image is greater than four times the width, i.e. r>4c, the image is termed very tall. If the image is very tall, and there are pixels to delete from the columns of the image, then the decision is made to divide the image into layers in step 310.

In steps 312 and 314, the width of the widest blank slice within the image (not on the margin or periphery) is compared to the height of the tallest blank layer within the image. In step 312, if the width of the widest blank slice is greater than the height of the tallest blank layer, and there are pixels to be deleted from rows of the image, then the image is divided into slices in step 306. In step 314, if the height of the tallest blank layer is greater than the width of the widest blank slice, and there are pixels to be deleted from the columns of the image, then the image is divided into layers in step 306.

In steps 316 and 318, the aspect ratio of the image is again tested. In step 316, if the width of the image is greater than twice the height, i.e. c>2r, the image is termed flat. If the image is flat, and there are pixels to delete from the rows of the image, then the decision is made to cut the image into slices in step 306. In step 318, if the height of the image is greater than twice the width, i.e. r>2c, the image is termed tall. If the image is tall, and there are pixels to delete from the columns of the image, then the decision is made to divide the image into layers in step 310.

In steps 320 and 322, both the aspect ratio of the image and the presence of blank slices or layers within the image being partitioned is tested. The presence of blank slices and layers within the image is indicated by a non-zero value for the width of the widest blank slice and the height of the tallest blank layer, respectively. In step 320, if the width of the image is greater than the height, i.e. c>r, the image is termed somewhat flat. If the image is somewhat flat, and there is a blank slice within the image, and there are pixels to delete from the rows of the image, then the decision is made to cut the image into slices in step 306. In step 322, if the height of the image is greater than the width, i.e. r>c, the image is termed somewhat tall. If the image is somewhat tall, and there is a blank layer within the image, and there are pixels to delete from the columns of the image, then the decision is made to divide the image into layers in step 310.

In steps 324 and 326, only the presence of blank slices or layers within the image boeing divided is tested. In step 324, if there is a blank slice within the image, and there are pixels to delete from the rows of the image, then the decision is made to cut the image into slices in step 306. In step 326, if there is a blank layer within the image, and there are pixels to delete from the columns of the image, then the decision is made to divide the image into layers in step 310. Similarly, in steps 328 and 330, only the aspect ratio of the image being divided is tested. In step 328, if the image is somewhat flat, and there are pixels to delete from the rows of the image, then the decision is made to cut the image into slices in step 306. In step 330, if the image is somewhat tall, and there are pixels to delete from the columns of the image, then the decision is made to divide the image into layers in step 310.

If none of the above tests results in a decision, then a simple decision is made based solely upon whether there are pixels to be deleted from the rows or columns of the image. In step 332, if there are pixels to be deleted from rows of the image, then a decision is made to divide the image into slices in step 306. If no pixels are to be deleted from rows of the image, then (by default), there are pixels to be deleted from columns of the image, and a decision is made to divide the image into layers in step 310.

Referring again to FIG. 5, the width c of the image is 33 columns, and the height r is 10 rows. As described above, 3 pixels are to be deleted from each column, and 19 pixels are to be deleted from each row of the image. The width of the widest blank slice within the image is 11, and the height of the tallest blank layer is 0. The image being divided is neither very tall nor very flat (steps 304 and 308). However, the width (11) of the widest blank slice within the image is larger than the height (0) of the tallest blank layer. Thus, when the steps illustrated in FIG. 4 are performed, a decision is made to divide the image into slices in step 312. The overall decision process of FIG. 4 is arranged so as sometimes to obviate the need for constructing the horizontal profile HP or the vertical profile VP, or both, each of which is a time consuming process.

Figures 6, 7:
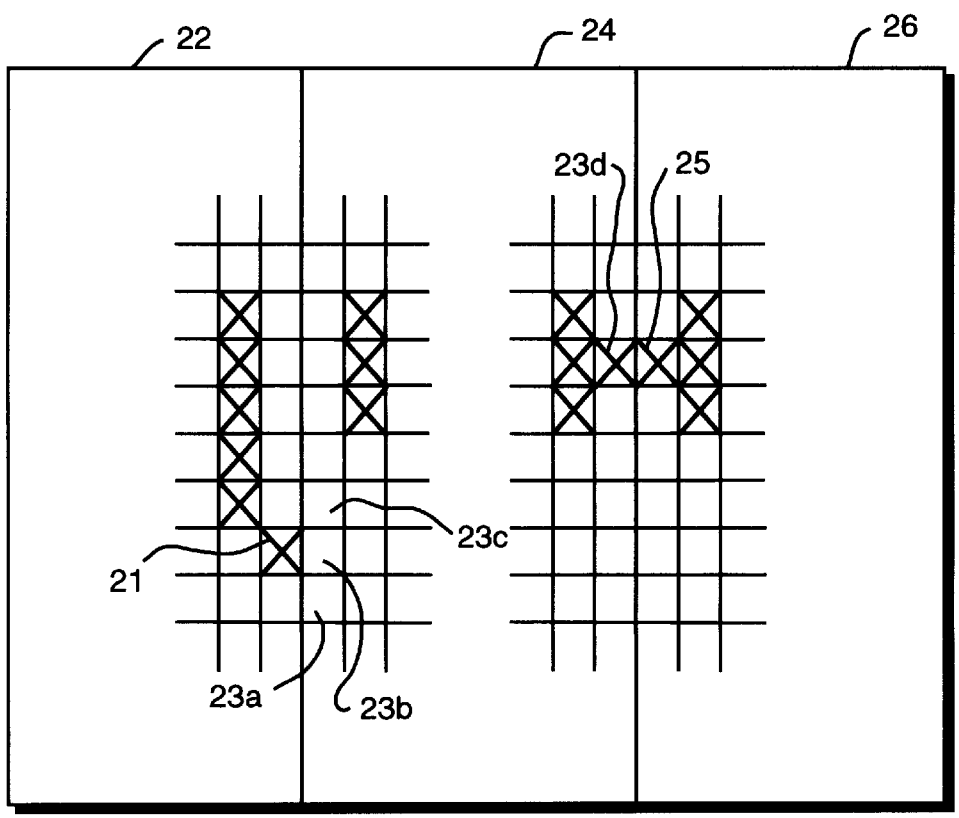
FIG. 6 is a table of information generated and used by the compression process according to the present invention.

Referring again to FIG. 3, in step 206 an appropriate profile of the image is processed to divide the image into alternating blank and occupied bands. If the image is being divided into slices, then the vertical profile VP is processed, and if the image is being divided into layers, then the horizontal profile HP is processed. Continuing the example of FIG. 5, the following description will describe the division of the image into slices using the vertical profile VP. Unless specifically pointed out below, similar processing is performed to divide an image into layers, but using the horizontal profile HP. In either case, a table of information related to the image being divided is generated, and subsequently used by this process. FIG. 6 illustrates a table of such information.

If the first number in the vertical profile VP, representing the number of foreground pixels in the first column, is a zero, this indicates that the first band is a blank band (no foreground pixels), otherwise the first band is an occupied band (having foreground pixels). The extent of this first band is determined by continuing to traverse the vertical profile VP until an entry is found indicating a different type of band, i.e. a non-zero entry, representing an occupied column, when processing a blank band, or a zero entry, representing a blank column, when processing an occupied band. Then an entry is made in the table (of FIG. 6) representing the current band. Entries in the table include the starting column of the band, the ending column of the band, and the band type (i.e. blank or occupied). Then the extent of the next band is similarly determined, until all bands in the image have been identified.

Referring specifically to the vertical profile VP illustrated in FIG. 5, the first value in the vertical profile VP is a 0. This means that the first band B1 in the image is a blank band. Entries in the vertical profile VP are traversed until a non-zero entry is found. The extent of the first band is thus identified. Entries are made in the "Start", "End" and "Type" columns for the first (topmost) entry in the table illustrated in FIG. 6 indicating that the starting column of the first band B1 is column 0, the ending column in the first band B1 is 2, and the type of band is a blank band, the latter indicated by a value "BLANK" in the "Type" column, which will be described in more detail below. The extent of the second band is now determined. Entries in the vertical profile VP are now traversed until a zero-valued entry is found. The extent of the second band is thus identified. Entries are made in the second entry in the table illustrated in FIG. 6 indicating that the first column of the second band B2 is 3 and the last column of the second band B2 is 7 and the type of band is an occupied band, the latter indicated by a value in the "Type" column to be described in more detail below. The remainder of the vertical profile VP is traversed in a similar manner to identify the extents and types of the remaining bands B3–B7. The table illustrated in FIG. 6 contains the entries in the "Start", "End" and "Type" columns corresponding to the vertical profile VP illustrated in FIG. 5 generated in step 206.

In the table illustrated in FIG. 6, an occupied band is generally identified by a non-negative number. The value of the non-negative number indicates the column within that band having the smallest number of foreground pixels. For example, for band B4 illustrated in FIG. 5, the column having the same smallest number of foreground pixels, one, is the last column of band B4, column 16. Thus, the entry in the "Type" column for band B4 is 16. Within any such band, there may be more than one column having this minimum number of foreground pixels. In the illustrated embodiment, the number of the first such column is stored in the table. For example, for band B6 illustrated in FIG. 5, there are two columns having the same smallest number of foreground pixels, one: the first column, 28, and the last column, 30. The entry in the "Type" column of the table illustrated in FIG. 6 is the first such column, thus the entry in the "Type" column for band B6 is 28. This data will be used in subsequent processing, described in more detail below.

In order to distinguish easily between blank and occupied bands, the value placed in the table to represent blank values is a large negative number, e.g. −32002. Consequently, if the value in the "Type" column of the table of FIG. 6 is non-negative, that band is an occupied band and the number represents the column having the smallest number of foreground pixels, but if the value is −32002, the band is a blank band.

It is also necessary to identify an occupied band within which a forced cut may be made, termed the cut band in the remainder of this application, during this processing. During the processing of the vertical profile VP, information necessary to identify the widest occupied band is accumulated and stored and this band is designated the cut band. It is possible that more than one band will have the same "widest" width. In the illustrated embodiment, the first such "widest" occupied band is identified as the cut band. The identified cut band will be processed specially in subsequent processing, in a manner to be described in detail below. Referring to the image illustrated in FIG. 5, the widest occupied band, which, in the illustrated embodiment, is identified as the cut band, is band B2.

Alternatively, the occupied band containing the column with the fewest foreground pixels in the vertical profile (VP) could be identified as the cut band. Again, it is possible that more than one occupied band will contain a column with the same "fewest" number of foreground pixels. In this case, the first such band could be identified as the cut band. Referring to the image illustrated in FIG. 5, column 16, the last column in band B4; column 28, the first column in band B6; and column 30, the last column in band B6; all contain the minimum number of foreground pixels: one. The first band containing a column having the minimum number of foreground pixels, band B4, could be identified as the cut band.

To identify the cut band to subsequent processing in steps 214 and 216 (of FIG. 3), the entry in the "Type" column of the table of information for the cut band is changed. Specifically, the band type of the cut band is changed to a negative number having a value calculated as follows. For example, if the column having the fewest foreground pixels in the band is designated as i (determined according to the processing described above), then the band type is set to i −32000. (This identification number may still be distinguished from the large negative number indicating a blank band, which is −32002, as described above.) Thus, the number in the "Type" column in the table of information now identifies a band as: a blank band (−32002); an occupied band (non-negative number); or a cut band (negative number between −1 and −32000).

Referring specifically to the vertical profile illustrated in FIG. 5, band B2 is the widest occupied band, having a width of 5. The entry in the table illustrated in FIG. 6 for the type of band B2 is set to indicate that it is the cut band. For band B2, column 3 is the first column having the minimum number of foreground pixels, two. Thus, the entry in the "Type" column for band B2 is set to 3 −32000, or −31997.

In step 208, weights are assigned to the bands developed in step 206. These weights are used in step 210, described below, in apportioning the pixels to be deleted from each row of the image among the resulting subimages with more such pixels being allocated to subimages including bands with higher weights. FIG. 7 is a storage diagram of a portion of rasterized source image array data useful in understanding the assignment of weights to bands as illustrated in step 208 of FIG. 3. FIG. 7 illustrates three subimages 22, 24 and 26, adjoining horizontally, which had previously been divided into slices vertically. Portions of the pixels in these subimages are illustrated as small squares; squares with crosses in them represent foreground, or black, pixels and squares which are blank represent back-ground, or white, pixels. Referring again to step 208 of FIG. 3, weights are assigned to the bands developed in step 206 in one of two ways.

If an image being processed has a foreground object which extends to the periphery of that image and into an adjoining image, then there is a possibility that when the two adjoining images are compressed in the perpendicular direction, the foreground object may be sheared apart. That is, if a foreground object extends to an adjoining image on the right-hand or left-hand side, subsequent vertical compression (dividing into layers) of the two adjoining images may shear the object. Similarly, if a foreground image extends to an adjoining image above or below, subsequent horizontal compression (dividing into slices) of the adjoining images may shear the object. To prevent this, when two such adjoining images are so compressed, both are forced to be compressed proportionately in the perpendicular direction, at least in the neighborhood of the foreground object. To compress an image proportionately, the respective numbers of pixels to be deleted from rows and columns of the parent image are allocated to its respective subimages in proportion to the width of each such subimage, regardless of the contents of the subimage. When compressed in this manner, the foreground object will be least likely to be sheared apart.

On the contrary, if no foreground image extends between two adjoining subimages, then there is no problem of shearing of any foreground objects, and the two subimages, if also unconstrained at their opposite edges, may be compressed independently. This is the preferred method of compression because disproportionately more pixels may be deleted from blank areas, and fewer from occupied areas. This maximizes the preservation of detail and legibility by deleting more pixels from areas which carry no detail, and fewer from the areas which carry detail.

Referring again to FIG. 7, in subimage 22, there is one foreground pixel 21 which is on the right-hand periphery of subimage 22, but pixel 21 does not form part of an object which extends to adjoining subimage 24, as indicated by three adjacent background pixels 23a, 23b and 23c on the left-hand periphery of subimage 24. Such an edge is termed unpinned in the description below. Subimage 22 may thus be divided into layers independently of subimage 24. In subimage 24, however, there is a foreground pixel 23d, which is on the right-hand periphery, which does form a part of a foreground object which extends to adjoining subimage 26, as indicated by the foreground pixel 25 in subimage 26. Such an edge is termed pinned in the description below. Both the right-hand edge of subimage 24 and the left-hand edge of subimage 26 are pinned. As described above, in order not to shear this foreground object, both subimages 24 and 26 must be divided into layers proportionately. The edges of the subimages generated from the image being divided are analyzed in a later step of FIG. 3 to determine whether they are pinned or unpinned, and this analysis will be described below.

As described above, weights are allocated to the bands resulting from step 206 in one of two ways, depending upon whether the image being divided must be divided proportionately, or may be divided independently of its neighbors. If the image must be divided proportionately, then the weight assigned to each band is equal to its width, which can be determined from the start and end entries in the table illustrated in FIG. 6. In addition, a total weight, which is the sum of the weights for all bands, is also calculated.

If, however, the image may be divided independently, then a disproportionately higher weight is given to blank bands so that a disproportionately larger number of pixels may be deleted from such blank bands. In a preferred embodiment, if the image may be divided independently from its neighbors, then the weight allocated to an occupied band is equal to the width of that band, the weight allocated to a blank band on either end (i.e. a blank band not within the image) is equal to one and a half (1.5) times its width, and the weight allocated to a blank band in the middle of an image (i.e. within the image) is equal to three (3) times its width. In addition, a total weight, which is the sum of the weights for all bands, is also calculated.

Referring again to FIG. 5, the image illustrated has no foreground objects on its periphery, thus, it may be compressed independently of its neighbors. However, for the sake of illustration, if the image of FIG. 5 were required to be compressed proportionately, then each band would be allocated a weight equal to its width, and a total weight would be calculated equal to the sum of the weights allocated to all the bands. For example, the weight allocated to band, B1 would be 3, which is the width of band B1. The weight allocated to band B2 would be 5, the weight allocated to band B3 would be 6 and the weights of bands B4 to B7 would be: 3, 11, 3, and 2, respectively. A total weight is the sum of these weights, and is equal to 33.

As described above, the image of FIG. 5 may be compressed independently of its neighbors, thus, disproportionately higher weights are allocated to blank bands. For example, the weight allocated to band B1, which is a blank band not within the image, is equal to one and a half times its width, 3. Thus, the weight allocated to band B1 is 4.5. The weight allocated to band B2, which is an occupied band, is equal to its width. Thus, the weight allocated to band B2 is 5. The weight allocated to band B3, which is a blank band within the image, is equal to three times its width, 6. Thus, the weight allocated to band B3 is 18. Similarly, the weight allocated to band B4, an occupied band, is 3 (its width); the weight allocated to band B5, a blank band within the image is 33 (three times its width, 11); the weight allocated to band B6, an occupied band, is 3 (its width); and the weight allocated to band B7, a blank band not within the image, is 3 (one and a half times its width, 2). A total weight is the sum of these weights, and is equal to 69.5. These calculated weights are also stored in the "Weight" column of the table of information illustrated in FIG. 6.

Referring again to FIG. 3, in step 210, the pixels to be deleted from each row of the image being divided are apportioned to the bands according to their weights. Because only integer numbers of pixels may be deleted from any row within each band, but the ideal apportioned deletions (corresponding to the weights) are real numbers, it is possible, in fact it is likely, that the actual integer number of pixels apportioned to be deleted from each row of a band will not exactly correspond to the ideal number. The apportionment is performed in step 210 in such a manner as to minimize the maximum absolute percent error between the actual and ideal numbers, while the deletions are constrained to be greater or equal to zero, but less than or equal to the width of the band.

Figure 8:
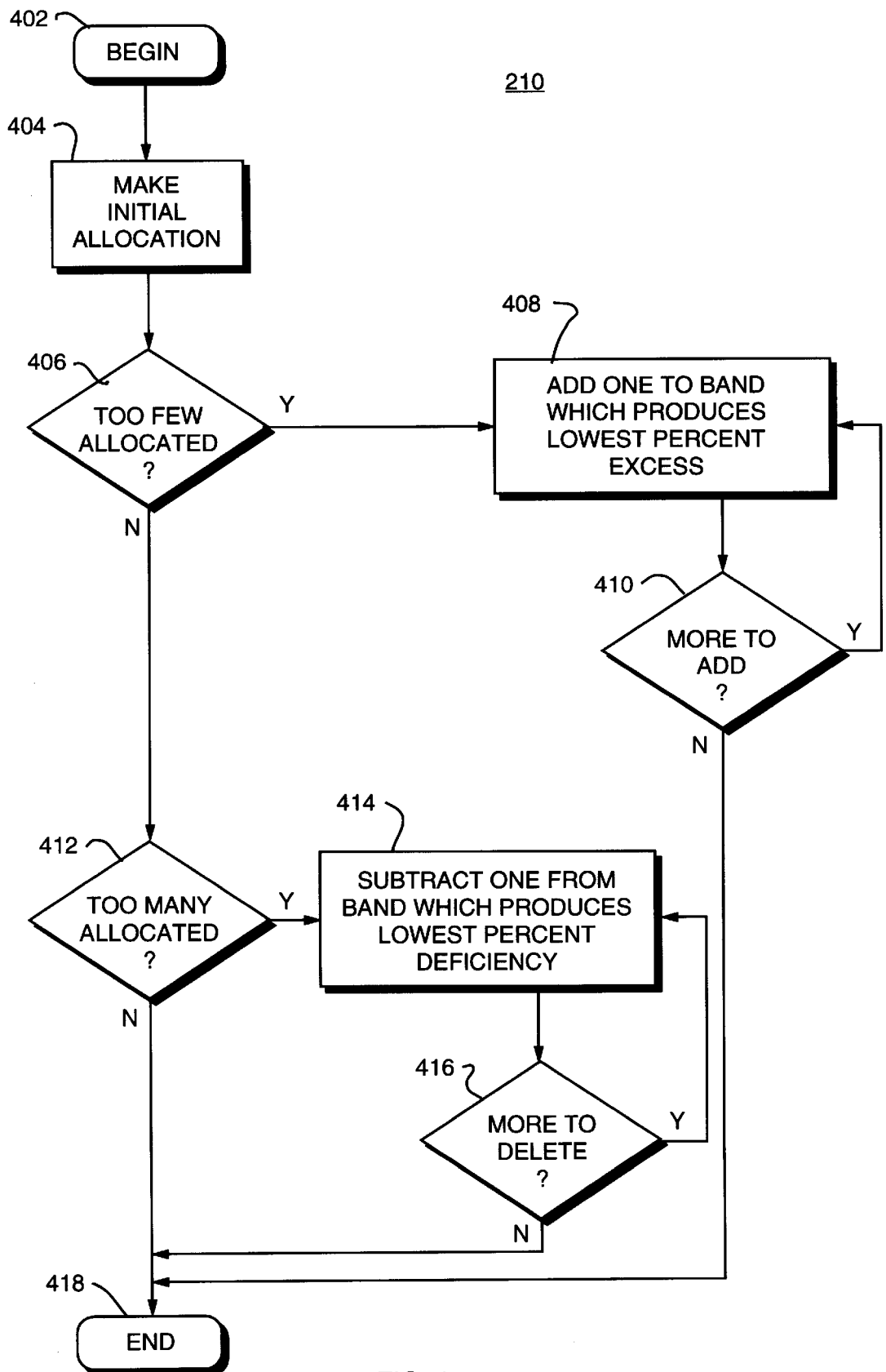

FIG. 8 is a more detailed flow diagram illustrating the process 210 of apportioning pixels to be deleted from each row of the image being divided to the bands according to their weights, as described above. The apportionment step 210 (of FIG. 3) begins in step 402, in which any required initializations are performed. In step 404, an initial allocation of pixels to delete from each row is made to each band, according to that band's weight, the total weight and the total number of pixels to be deleted from each row of the image being divided. For each band: first, an estimate of the number of pixels to be deleted from each row of that band is calculated. This estimate is calculated as the product of the total number of pixels to delete from each row times the quotient of the weight allocated that band divided by the total weight. This initial estimate may be a fractional number, and is termed the ideal allocation in the description below. Then the closest integer to the initial estiate is determined, and that number of pixels is initially allocated to that band. The initial allocation for each band is calculated in the this manner: without considering the allocations to any other band.

In step 406, a check is made to determine whether too few pixels were allocated for deletion in step 404. This is done simply by calculating the sum of the number of pixels initially allocated for deletion in step 404, and comparing the sum to the total number of pixels specified for deletion. If there were not too few allocated, then, in step 412, a check is made to determine whether too many pixels were initially allocated in step 404. If there were neither too many nor too few pixels allocated, then the apportionment of pixels to delete to delete from the rows of the bands is complete, and this process ends in step 418.

If, in step 406, however, it was determined that too few pixels were initially allocated to the bands to be deleted from each row of the image, then more must be allocated. More pixels are allocated one at a time until the required number of pixels are allocated. In step 408, for each band in turn, the effect of allocating an extra pixel to be deleted from the rows of that band is evaluated. First, the current allocation to that band is incremented. Then the percentage of excess allocation of the newly incremented allocation over the ideal allocation (which was calculated as described above) is calculated. Specifically, the percentage of excess is calculated as the quotient of the difference of the newly incremented allocation minus the ideal allocation, divided by the ideal allocation. The band with the lowest resulting percent excess of allocation is identified, and one pixel is added to the previous allocation for that band.

An optional enhancement to the above process is to disregard bands which already have a substantial proportion of pixels in each of it's rows already marked for deletion. For example, if a band initially has more than three-quarters of the pixels in each of its rows marked for deletion, then that band is skipped in the above evaluation, and no more pixels may be allocated to that band.

In step 410, a check is made to determine whether more pixels need to be allocated to the bands. If so, then step 408 is performed again to allocate another pixel, again to the band which, after the extra pixel has been allocated, has the lowest resulting percent excess allocation. When step 408 is performed again, the current allocation of pixels to delete to the bands, including increments from previous performances of step 408, is used in calculating the percent excess allocation. When there are no more pixels to be allocated, then the allocation process ends in step 418.

If, in step 412, it was determined that too many pixels were initially allocated to be deleted from each row of the bands, then some initially allocated pixels must be deallocated. Pixels are deallocated one at a time until the required pixels have been deallocated. In step 414, for each band in turn, the effect of deallocating one pixel from that band is evaluated. First, the initial allocation to that band is decremented. Then the percentage of deficiency in allocation of the newly decremented allocation from the ideal allocation is calculated. Specifically, the percentage of deficiency is calculated as the quotient of the difference of the ideal allocation minus the newly decremented allocation, divided by the ideal allocation. The band with the lowest resulting percent deficiency of allocation is identified, and one pixel is subtracted from the previous allocation for that band.

An optional enhancement to the above process is to disregard bands for which only a single pixel was initially allocated. Decrementing the allocation for such a band would result in a zero allocation for the band, which is avoided by disregarding such bands.

In step 416, a check is made to determine whether more pixels to delete from each row of the image being divided need to be deallocated. If more need to be deallocated, then step 414 is performed again to deallocate another pixel from the band from which such a deallocation will produce the lowest percent deficiency of allocation. When step 414 is performed again, the current allocation of pixels to delete from each row of the bands, including decrements from previous performances of step 414, is used in calculating the percent deficiency of allocation. When there are no more pixels to be deallocated, then the allocation process ends in step 418.

Referring to the image illustrated in FIG. 5, and the table of information illustrated in FIG. 6, first, pixels to be deleted from each row of the image being divided are allocated to each band equal to the closest integral number of pixels to the (possibly fractional) ideal allocation. As described above, it is required to delete 19 pixels from each row of the image of FIG. 5. In step 404 (of FIG. 8), starting with band B1, the quotient of the band weight, 4.5, divided by the total weight, 69.5, is about 0.065. This ratio times the total number of pixels to delete, 19, gives the ideal allocation: 1.23. The closest integer to this ideal allocation is 1. Thus, an initial allocation of 1 is allocated to band B1. For band B2, the quotient of the band weight, 5, divided by the total weight is about 0.072. This yields an ideal allocation of 1.37. The closest integer to this ideal allocation is 1, which is initially allocated to band B2. In a similar manner, initial allocations are made to bands B3 to B7 of: 5, 1, 9, 1, and 1, respectively. The total number of pixels initially allocated in this manner is 19, which is the required number of pixels. Because, neither too many, nor too few pixels were allocated to be deleted from each row of the image illustrated in FIG. 5 in step 404, the process ends in step 418.

Assume now, for the sake of illustration, that 20 pixels were to be deleted from each row of the image being divided. The result of step 404, described above, when attempting to delete 20 pixels gives the following initial allocations for the bands B1 to B7 of FIG. 6: 1, 1, 5, 1, 9, 1 and 1, respectively. The total number of pixels preliminarily allocated in this manner is 19, which is one less than the required number of pixels, 20. In step 406, therefore, it is determined that too few pixels have been allocated to the bands of the image illustrated in FIG. 5, and step 408 is performed to allocate the remaining required pixels, which is one, in this case.

In step 408, the effect of incrementing the allocation for each band is evaluated in turn. For band B1, the initial allocation, 1, is incremented, resulting in a proposed allocation of 2. The percentage of excess of the proposed allocation, 2, over the ideal allocation, which in this case is 1.29 (calculated as described above), is then calculated. Also as described above, the percentage of excess is the quotient of the difference of the proposed allocation minus the ideal allocation divided by the ideal allocation. The difference of the proposed allocation, 2, minus the ideal allocation, 1.29, is 0.71. The ratio of this difference, 0.71, to the ideal allocation, 1.29, is 54%. In a similar manner, the percentage excess of the proposed allocation over the ideal allocation for bands B2 to B7 are: 39%, 16%, 132%, 5%, 132% and 132%, respectively. In this case, band B5 has the lowest percentage excess allocation, 5%, and its initial allocation, 9, is incremented to 10. In step 410, it is determined that all 20 required pixels have been allocated, and no more remain to be allocated. Thus, the process ends in step 418. If, however, another pixel to delete needed to be allocated, then the selection of the band to increment would have been calculated based on the pixels to delete currently allocated to the bands. The current allocation for band B5 in this case would be 10 pixels, and not the initial allocation of 9 pixels. This current allocation would be incremented to a proposed 11 pixels, then the percent excess allocation would be calculated based on the proposed 11 pixels.

Assume now, for the sake of illustration, that 18 pixels were to be allocated. The result of step 404, described above, when attempting to delete 18 pixels gives the following initial allocations for the bands B1 to B7 of FIG. 6: 1, 1, 5, 1, 9, 1 and 1, respectively. The total number of pixels initially allocated in this manner is 19, which is one more than the required number of pixels, 18. In step 412, therefore, it is determined that too many pixels have been allocated to the bands, and step 414 is performed to deallocated the excess pixels, which is one, in this case.

In step 414, the effect of decrementing the allocation for each band is evaluated in turn. For band B1, the initial allocation, 1, is decremented, resulting in a proposed allocation of 0. In accordance with the enhancement described above, further evaluation of band B1 is skipped, and the next band, B2, is evaluated. In this example, bands B1, B2, B4, B6 and B7 all are skipped. Bands B3 and B5 are further evaluated, however. For band B3, the initial allocation, 5, is decremented, resulting in a proposed allocation of 4. The percentage of deficiency of the proposed allocation, 4, from the ideal allocation, which in this case is 4.66, is then calculated. As described above, the percentage of deficiency is the quotient of the difference of the ideal allocation minus the proposed allocation divided by the ideal allocation. The difference of the ideal allocation, 4.66, minus the proposed allocation, 4, is 0.66. The ratio of this difference, 0.66, to the ideal allocation, 4.66, is 14%. In a similar manner, the percentage deficiency of the proposed allocation from the ideal allocation for band B5 is 6%. In this case, band B5 has the lowest percentage deficiency of allocation, 6%, and its initial allocation, 9, is decremented to 8. In step 416, it is determined that the 18 required pixels have been allocated, and no more remain to be deallocated. Thus, the process ends in step 418.

When the appropriate number of pixels to delete from each row of the image being divided have been apportioned to the respective bands, that information is entered into the column marked "Delete" of the table of information illustrated in FIG. 6. In the present example, the number of pixels to delete from the respective bands B1 to B7 are: 1, 1, 5, 1, 9, 1 and 1.

Referring again to FIG. 3, after pixels to delete from each row of the respective bands have been apportioned in step 210, then the resulting table of information is evaluated, in steps 212 and 214, to determine where to divide the image to generate the subimages. In general, if any pixels to be deleted are allocated to blank bands, then the subimages may be generated by deleting that allocated number of columns from those blank bands, and forming subimages from the occupied bands, the remaining portions of the blank bands after the columns were deleted, and those blank bands from which no columns were to be deleted. On the other hand, if no pixels have been allocated to be deleted from blank bands then, according to the process of step 214 (described in detail below), a single subimage, having exactly the same extent as the image being divided, and exactly the same burden of pixels to delete from each row would be generated. When this subimage is subsequently processed, the same result would occur again, and an infinite loop would result. To avoid this, in step 212, a check is made to detect this situation. If detected, then a forced cut is made through one occupied band, the cut band, deleting one column from that band, resulting in two subimages, thus, avoiding an infinite loop.

In step 212, a check is first made to determine if any pixels were allocated to be deleted from blank bands. This may be done by a simple check of the data previously stored in the "Type" and "Delete" columns of the table of information illustrated in FIG. 6. If so, then the processing continues in step 214. However, if no columns are to be deleted from blank bands then the cut band, identified above in step 206 as the widest occupied band, must be deliberately divided to form two subimages by deleting one column. The column to be deleted, termed a cut column in the following description, is selected in an attempt to satisfy two desirable criteria: it should have relatively few foreground pixels; and it should be near the center of the band.

In step 212, if it is necessary to force a cut in the cut band, the "Start" and "End" columns of the previously identified cut band are first retrieved from the table of information (of FIG. 6), and a middle location is calculated as the average of the "Start" and "End" columns of the cut band. Then the entries in the vertical profile VP (of FIG. 5), representing the foreground pixel count for each column in the cut band, are traversed. A respective number for each such column is then calculated which is the sum of the number of foreground pixels in that column plus the distance, in columns, of that column from the middle location (as calculated above) of the cut band. The column with the lowest such number is selected as the location for the forced cut, i.e. the cut column.

Alternatively, the entry in the "Type" column in the table of information (of FIG. 6) for the cut band may be used to identify at which column in the cut band the forced cut is to be made. As described above, the number in the "Type" column of the table of information identifies the first column within an occupied band having the fewest foreground pixels. This entry may be used to identify the column in the cut band at which the forced cut is made, regardless of where within the cut band that column is. The cut column may be recovered by adding 32000 to the entry in the "Type" column in the table of information (of FIG. 6).

In step 214, the completed table of information (of FIG. 6) is analyzed to determine the division points in the image being divided of the subimages. In general, only blank bands from which pixels have been allocated to be deleted from each row are actually cut, unless, as described above, a cut must be forced in the cut band. In these two cases, these pixels will be deleted from each row in the form of columns. The remainder of the pixels to be deleted from each row will be assigned to the resulting subimages to be subsequently deleted. The manner of dividing the image into subimages, however, depends upon whether the image is free to be divided independently of its neighbors, must be divided proportionately, and/or includes a forced cut.

If the image may be divided independently of its neighbors, then if a blank band from which columns are to be deleted is on either end of the image being divided, that band is compressed by deleting those columns from the end portions, otherwise it is compressed by deleting those columns from the middle of the band. The remaining portions of these compressed blank bands are combined with adjoining occupied bands and blank bands from which no columns are to be deleted to form subimages.

Figure 9:
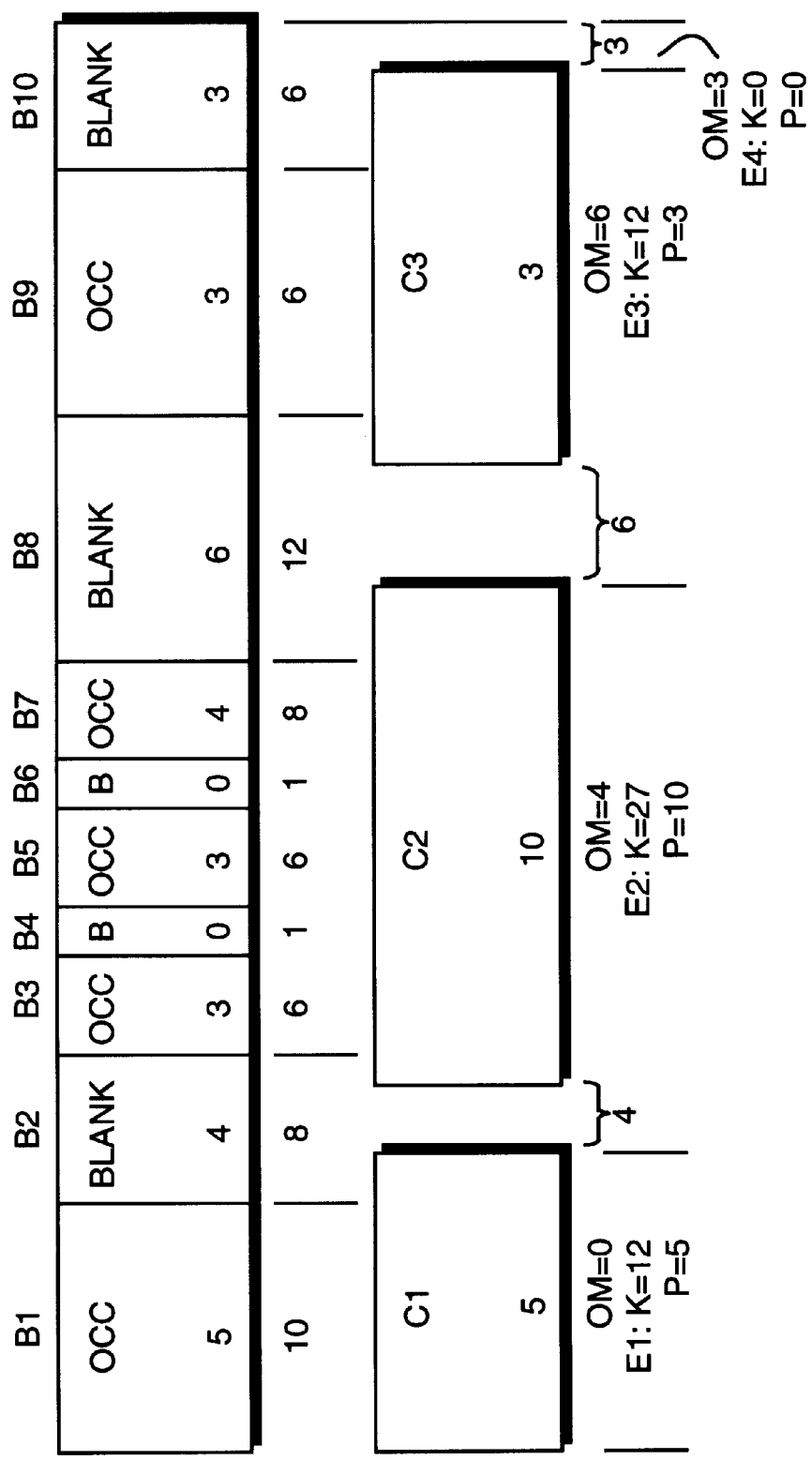

FIG. 9 is a memory layout diagram of image representative data in the same format as FIG. 5, but without illustrating individual pixels or rows and columns. The topmost portion illustrates the layout of the image being divided, and the bottommost portion illustrates the respective layouts of the resulting subimages if the image may be divided independently of its neighbors. In the topmost portion, each band is represented as a separate rectangle. At the top of each rectangle, the type of band is indicated: either occupied (OCC) or blank (BLANK or B). At the bottom of each rectangle is the number of pixels which were allocated to be deleted from each row of that band. Beneath each rectangle is the width of that rectangle.

The first band B1 is an occupied band to which five pixels have been allocated to be deleted from each row, and the second band B2 is a blank band to which four columns have been allocated to delete. The first subimage C1 is formed by first deleting four columns from the middle of band B2, and then combining band B1 and the left-hand remaining portion of band B2. Bands B3 to B7 are adjoining bands which are either occupied, or blank but to which no columns have been allocated to delete. Band B8 is a blank band with 6 columns to delete. Subimage C2 is formed by first deleting six columns from the middle of band B8, and then combining the right-hand remaining portion of band B2, bands B3 to B7, and the left-hand remaining portion of band B8. Band B9 is an occupied band with 3 pixels to delete from each row, and band B10 is a blank band with 3 columns to delete. Subimage C3 is formed by first deleting three columns from the end of band B10, then combining the right-hand remaining portion of band B8, band B9, and the left-hand remaining portion of B10.

Blank bands B2, B8 and B10 have all their allocated column deletions performed by this process. The resulting subimages, however, will each subsequently be required to delete from each of its rows the sum of the number of pixels allocated to be deleted from each row of the bands forming them. Subimage C1, thus, is required subsequently to delete the five pixels allocated to be deleted from each row of band B1. Subimage C2 is required subsequently to delete ten pixels from each of its rows, which is the sum of the three pixels allocated to band B3, the three pixels allocated to band B5 and the four pixels allocated to band B7 to be deleted from each of their rows. Subimage C3 is required subsequently to delete the three pixels allocated to be deleted from each row of band B9. When divided in this manner, the portions remaining from the blank bands are available for further deletions when the subimages to which they are appended are subsequently processed.

If, however, the image must be divided proportionately, then all blank bands from which columns are to be deleted are compressed by deleting half those columns from one end of that band, the rest of those columns from the other end of that band, and forming a subimage from the remaining blank columns. The remaining adjoining occupied bands and blank bands from which no columns are to be deleted are combined to form subimages.

Figure 10:
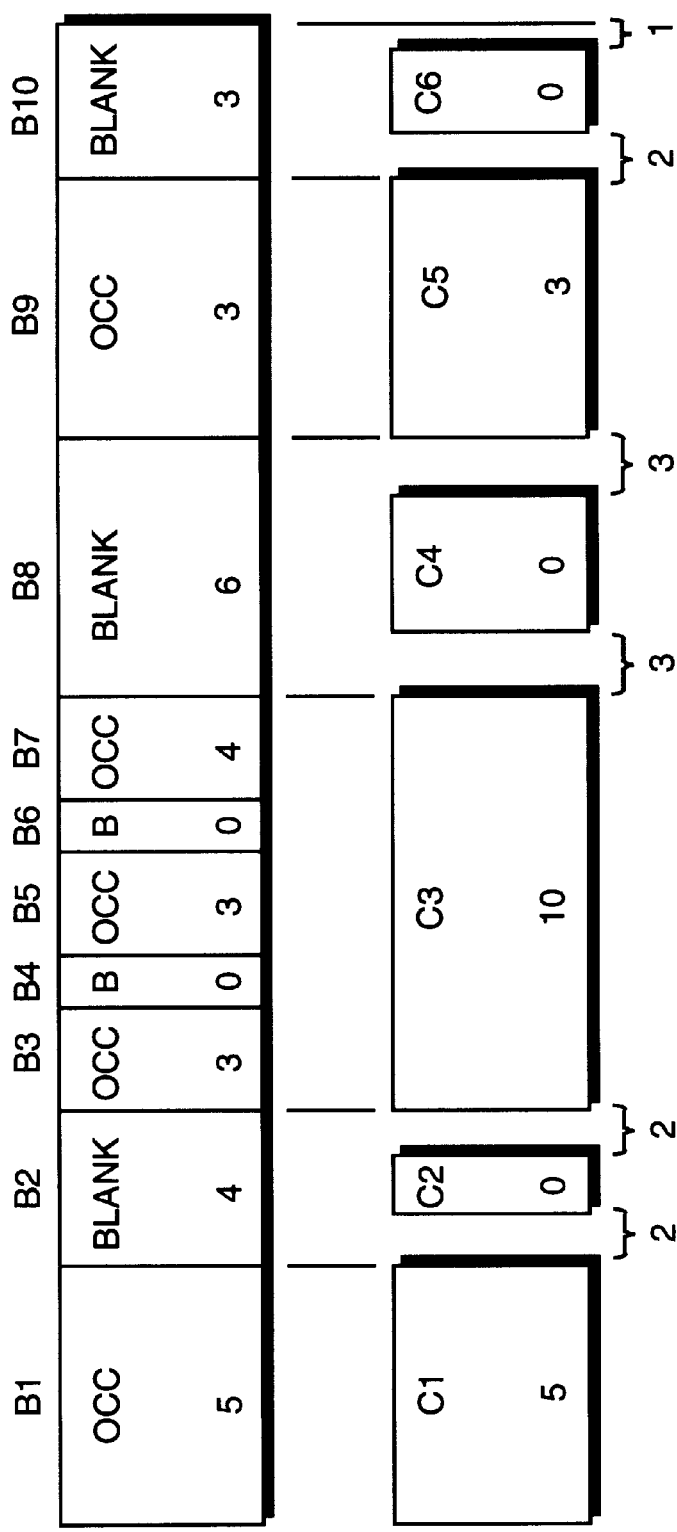

FIG. 10 is a memory layout diagram similar to FIG. 9. The topmost portion illustrates the layout of the image being divided, and the bottommost portion illustrates the respective layouts of the resulting subimages if the image must be divided proportionately.

The first subimage C1 is formed from occupied band B1. The subimage C2 is formed from blank band B2 from which its four allocated columns have been deleted half from each end of the band. (Because, however, the blank band B2 contains only background pixels, it does not really matter where within the band the columns are deleted.) Subimage C3 is formed from the adjoining occupied bands, B3, B5 and B7, and blank bands, B4 and B6, from which no columns are allocated to delete. Subimage C4 is formed from blank band B8 from which its six allocated columns have been deleted half from each end of the band. Subimage C5 is formed from occupied band B9. Subimage C6 is formed from blank band B10 from which its three allocated columns have been deleted half from each end of the band.

Bands B2, B8 and B10, which produced subimages C2, C4 and C6, respectively, have all their allocated column deletions performed by this process. The other subimages are still required to delete the sum of the number of pixels allocated to be deleted from the rows of the bands forming them. Subimage C1, thus, is required subsequently to delete the five pixels allocated to band B1. Subimage C3 is required subsequently to delete ten pixels from each row, which is the sum of the three pixels allocated to band B3, the three pixels allocated to band B5 and the four pixels allocated to band B7. Subimage C5 is required subsequently to delete the three pixels allocated to band B9. When divided in this manner, the blank subimages, C2, C4 and C6 are not available for further deletions, because such deletions could degrade the proportionality of compression of the image being compressed and shear foreground objects, as described above.

As described above with respect to step 212 (of FIG. 3), when a cut is to be forced within a band, the entry in the "Type" column of the table of information (of FIG. 6), indicates the band in which the cut is to be made, the cut band, and may also identify which column is to be deleted, the cut column.

Figure 11:
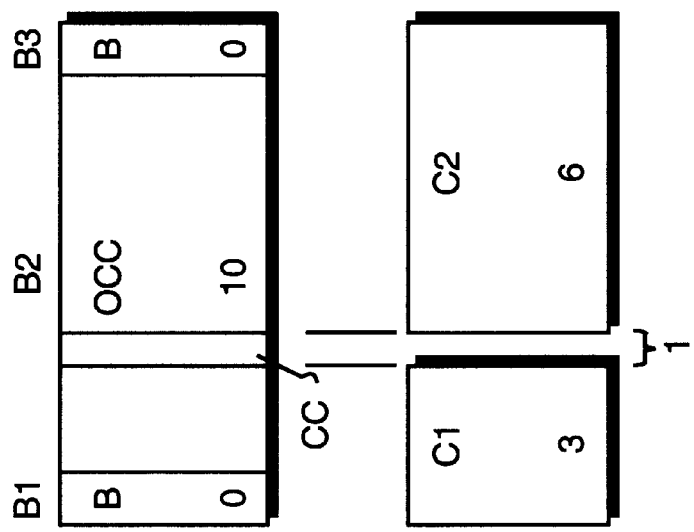

FIG. 11 is a memory layout diagram similar to FIG. 9 and FIG. 10. The topmost portion illustrates the layout of the image being divided, and the bottommost portion illustrates the respective layouts of the resulting subimages when the image is forced to be cut. Band B1 is a blank band from which no columns were allocated to be deleted. Band B2 is an occupied band from which 10 pixels are allocated to be deleted from each of the rows, and band B3 is a blank band from which no columns were allocated to be deleted.

In FIG. 11, the only band from which pixels are allocated to be deleted is an occupied band, thus, this image is forced to be cut. In step 212 (of FIG. 3), the occupied band B2 was identified as the cut band, and the column illustrated as CC was chosen as described above as the cut column. Because the cut column will be deleted, the number of pixels remaining to be deleted from each row of band B2 is first decremented to nine. Then two subimages C1 and C2 are formed with the cut column being deleted from between them. Then the number of pixels to be deleted from each row of each subimage is allocated to the two subimages C1 and C2 in proportion to their relative sizes. For example, in FIG. 11, subimage C1 contains roughly one half the number of columns of subimage C2. Thus, the nine remaining pixels to be deleted from each row are allocated with three being allocated to subimage C1 and six being allocated to subimage C2. In general, this allocation will not be exact. In these cases, any error is resolved by minimizing the larger percentage error.

Figure 12A:
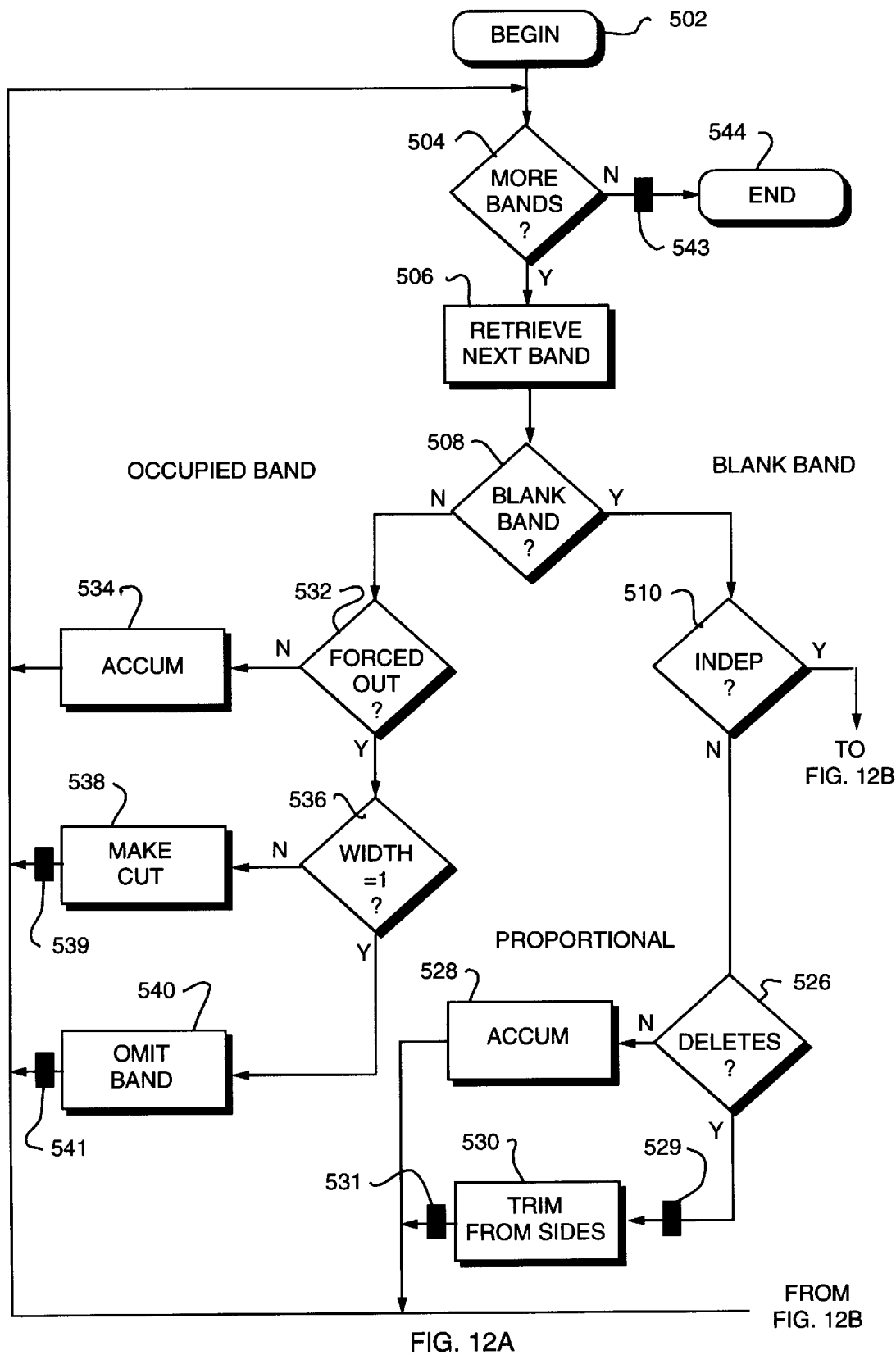
Figure 12B:
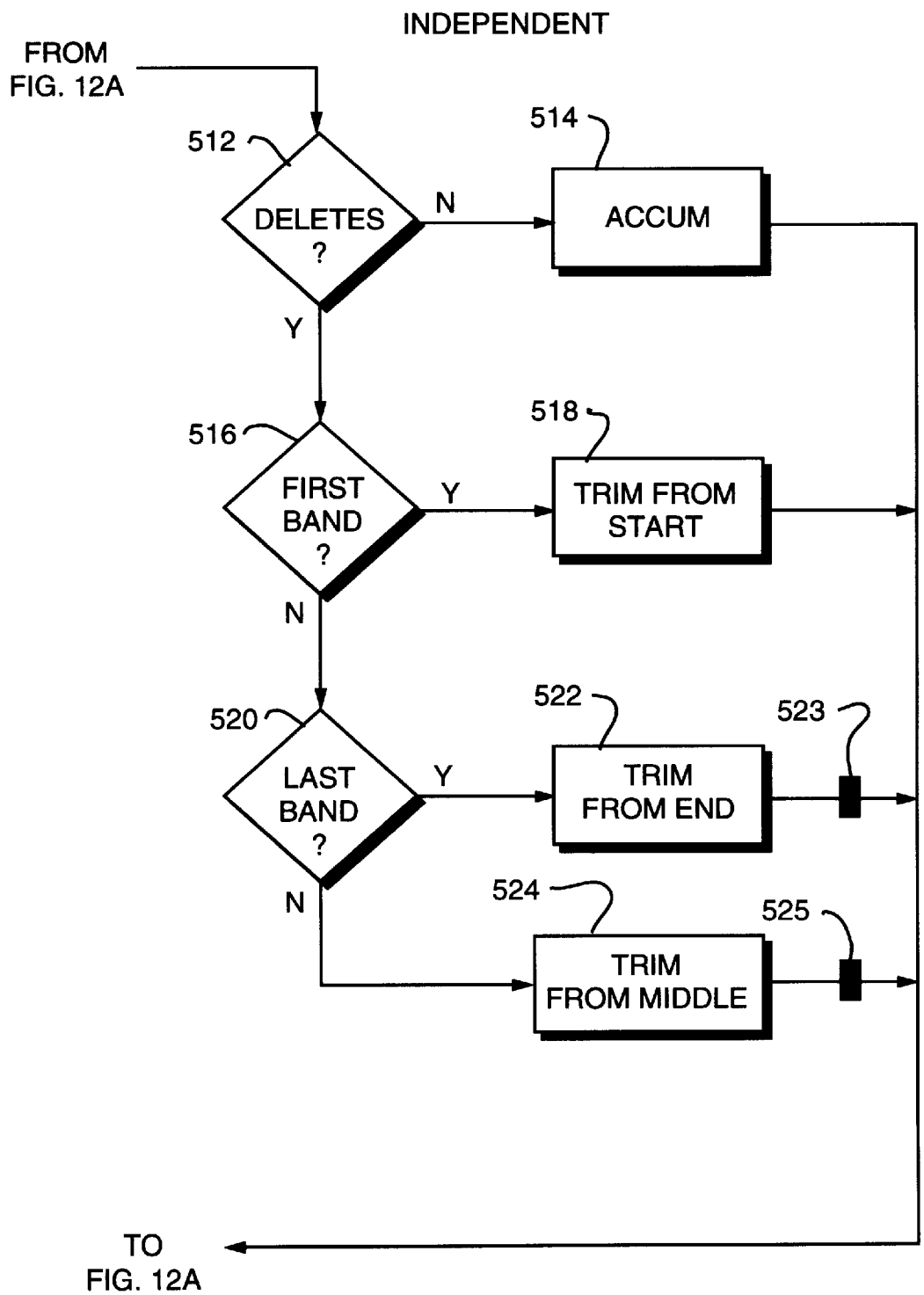

FIG. 12 is a more detailed block diagram illustrating the process of step 214 of composing the subimages by locating their division points in the image being divided. In general, the data gathered in the table of information (of FIG. 6), relating to the bands in the image being divided, is traversed from the first entry to the last. As the table data is traversed, data relating to a resulting subimage, is accumulated. At certain points in this processing, an entry (E), corresponding to a subimage, is generated containing the data accumulated up to that point. The points at which such entries (E) are generated are represented by small solid rectangles in FIG. 12. The data in each such entry consists of: a number (OM) of columns of the image being divided to omit when forming the corresponding subimage; a number (K) of columns in the image being divided to keep in the corresponding subimage; and a number (P) of pixels yet to be deleted from each row of the corresponding subimage, which number is passed to the resulting subimage. Columns which are to be omitted are omitted from the left-hand side. Similarly, for images which are being divided into layers horizontally, OM represents the number of rows of the image being divided to omit when forming the corresponding subimage; K represents the number of rows in the image being divided to keep in the corresponding subimage; and P represents the number of pixels yet to be deleted from each column of the corresponding subimage. Rows which are to be omitted are omitted from the top.

In step 502, the process 214 of composing the subimage data begins by performing any required initializations, including selecting the first band as the next one to be processed, and setting all the initial accumulation values (OM, K and P) for a new entry to 0. In step 504, a check is made to determine if any further bands remain to be processed. If not, then the process ends in step 544. Otherwise, in step 506, the data for the next band is retrieved from the table of information (of FIG. 6). In step 508, a check is made of the data in the "Type" column to determine if the band is a blank band. If the band is a blank band, then, in step 510, a check is made to determine whether the image being divided may be divided independently of its neighbors. If the band is a blank band, and the image may be divided independently of its neighbors, then FIG. 9, and its corresponding description, above, should be referenced. In step 512, a check is made of the data in "Delete" column of the table of information to determine whether any columns have been allocated to this band to delete. If no columns have been allocated to delete, then, in step 514, the number of columns to keep (K) for the entry currently being accumulated is incremented by the width of this blank band. Then the next band is processed by returning to step 504.

If, however, it was determined in step 512, that there were columns to delete from this blank band, then respective checks are made in steps 516 and 520 to determine whether the blank band is in an end position. Blank bands in these positions are treated specially by deleting their allocated columns from the ends (left end for a blank band in the first position, or right end for a blank band in the last position), rather than the middle, as is done for blank bands in the middle of the image being divided. Such special treatment reduces subsequent processing because it minimizes the number of subimages produced.

In step 516, a check is made to determine if this band is the first band. If this is the first band, then, as described above, the columns to delete are deleted from the beginning of the band. In this case, in step 518, the number of columns to omit (OM) for the entry currently being accumulated is incremented by the number of columns to delete from this first blank band, and the number of columns to keep (K) for the entry currently being accumulated is incremented by the difference of the width of this band minus the number of columns to be deleted. Then the next band is processed by returning to step 504.

If it was determined in step 516 that the current band was not the first band, then a check is made in step 520 to determine if it is the last band. If this is the last band, then the columns to delete are deleted from the end of the band (see bands B9 and B10, and subimage C3 of FIG. 9, and the corresponding description above.) In this case, in step 522, the number of columns to keep (K) in the entry currently being accumulated is incremented by the difference of the width of the band minus the number of columns to be deleted from that band. Then an entry (E) is generated (as described above) in step 523 containing the currently accumulated number of columns to omit (OM) and keep (K), and the number of pixels (P) subsequently to be deleted from each row of the corresponding subimage. Then an accumulation for another entry is started. For this new entry, the number of columns to omit (OM) is set to the number of columns to be deleted from this band, the number of columns to keep (K) is set to 0, and the number of pixels (P) subsequently to be deleted from each row of the corresponding subimage is set to 0. Then the next band is processed by returning to step 504.

If it was determined in step 520 that this is not the last band, then this is a blank band within the image. In this case, columns are deleted from the middle, and the remaining portions of this blank band are combined with the adjoining bands. (See bands B2 to B8, and subimage C2 of FIG. 9). In step 524, first the number of columns remaining in this band after deleting the columns allocated to be deleted is calculated. Then the number of columns to keep (K) in the entry being accumulated is incremented by an integer representing half that number of columns, and an entry (E) is generated in step 525 containing the accumulated number of columns to omit (OM) and keep (K), and the number of pixels (P) subsequently to be deleted from each row of the corresponding subimage. Then an accumulation for another entry is started. For this new entry: the number of columns to omit (OM) is set to the number of columns to be deleted from this band; the number of columns to keep (K) is set to the difference of the width of the current band minus a number of columns equal to the sum of the number of columns to be deleted from this band plus the number of columns accumulated in the previous entry to be kept; and the number of pixels (P) subsequently to be deleted from each row of the corresponding subimage is set to 0. Then the next band is processed by returning to step 504.

Referring again to step 510, if it was determined that the image must be divided proportionately, then each blank band with columns to delete forms a separate subimage. (See FIG. 10, bands B2, B8 and B10 and subimages C2, C4 and C6, respectively). In step 526, a check is made to determined whether there are any columns to delete from this blank band. If there are no columns to delete, then, in step 528, the number of columns to keep (K) in the entry currently being accumulated is incremented by the width of this band. Then the next band is processed by returning to step 504.

If it was determined in step 526 that there are columns to delete from this band, then, in step 530, columns are trimmed from both ends of the band to form a separate subimage. First, an entry (E) is generated in step 529 containing the currently accumulated number of columns to omit (OM) and keep (K), and number of pixels (P) subsequently to be deleted from each row of the corresponding subimage. Second, another.entry (E) is generated in which the number of columns to omit (OM) is set to an integer representing the one half the number of columns to be deleted from this band; the number of columns to keep (K) is set to the difference of the width of this band minus the number of columns to delete from this band; and the number of pixels (P) subsequently to be deleted from each row of the corresponding subimage is set to 0. Third, an accumulation for another entry is started. For this new entry, the number of columns to omit (OM) is set to the number of columns remaining to be deleted from this band, the number of columns to keep (K) is set to 0, and the number of pixels (P) subsequently to be deleted from each row of the corresponding subimage is set to 0. Then the next band is processed by returning to step 504.

Referring again to step 508, if it was determined that the current band is an occupied band, then a check is made in step 532 to determine whether this band is the cut band. If in step 532 it was determined that this band is not the cut band, then it is a normal occupied band. In step 534, the number of columns to keep (K) in the entry currently being accumulated is incremented by the width of this band, and the number of pixels (P) subsequently to be deleted from each row of the corresponding subimage is incremented by the number of pixels to delete from this band. Then the next band is processed by returning to step 504.

If in step 532 it was determined that this band is the cut band, then a check is made in step 536 to determine whether this band has only one column, i.e. its width is 1. If the band has more than one column, then the band may be cut in step 538 in the manner described above. (See FIG. 11 and its corresponding description above.) As described above, this band is divided into a first portion, and a second portion with the cut column separating them. In addition, also as described above, a first allocation of pixels subsequently to be deleted from each row of the corresponding subimage is made to the first portion, and a second allocation is made to the second portion, in proportion to their respective widths. In step 538, the number of columns to keep (K) in the entry currently being accumulated is incremented by the width of the first portion of the cut band, and the number of pixels (P) subsequently to be deleted from each row of the corresponding subimage is incremented by the first allocation. Then an entry (E) is generated in step 539 containing the currently accumulated number of columns to omit (OM) and keep (K), and the number of pixels (P) subsequently to be deleted from each row of the corresponding subimage. Then an accumulation for another entry is started. For this new entry, the number of columns to omit (OM) is set to one (representing the cut column), the number of columns to keep (K) is set to the width of the second portion of the cut band, and the number of pixels (P) subsequently to be deleted from each row of the corresponding subimage is set to the second allocation. Then the next band is processed by returning to step 504.

If in step 536 it is determined that the cut band has only one column, then the entire band is omitted in step 540. In this case, an entry (E) is generated in step 541 containing the currently accumulated number of columns to omit (OM) and keep (K), and the number of pixels (P) subsequently to be deleted from each row of the corresponding subimage. Then an accumulation for another entry is started. For this new entry, the number of columns to omit (OM) is set to one (representing the single column cut band), the number of columns to keep (K) is set to 0, and the number of pixels (P) subsequently to be deleted from each row of the corresponding subimage is set to 0. Then the next band is processed by returning to step 504.

When there are no more bands to process, a final entry (E) is generated, in step 543, containing the currently accumulated number of columns to omit (OM) and keep (K), and the number of pixels (P) subsequently to be deleted from each row of the corresponding subimage.

FIG. 9 illustrates, at the bottom, the series of entries E generated by the process illustrated in FIG. 12. When FIG. 12 begins, a new accumulation is prepared in which the number of columns to omit (OM), the number of columns to keep (K), and the number of pixels (P) subsequently to be deleted from the corresponding subimage are all set to 0. When band B1 is processed, step 534 is executed, in which K is incremented by the width, 10, of band B1, and now equals 10, and the number of pixels (P) subsequently to be deleted from each row of the corresponding subimage is incremented by the number of pixels to delete from each row of the band, 5, and now equals 5.

When band B2 is processed, step 524 is executed in which the width, 8, of the band is decremented by the number of columns to delete, 4, leaving four remaining columns. K is incremented by one half of these remaining columns, 2, and now equals 12. Then an entry E1 is generated in step 525 containing the accumulated number of columns to omit (OM=0) and keep (K=12), and the accumulated number of pixels subsequently to be deleted from each row of the corresponding subimage (P=5). Then another accumulation is begun with OM set equal to the number of columns to delete from band B2, 4; K set equal to the difference of the width of the band, 8, minus a value calculated as the sum of the columns to be deleted from the band, 4, plus the remaining columns not accumulated in entry E1, 2; i.e. K=8−(4+2)=2, and P set equal to zero.

When band B3 is processed, step 534 is executed again, in which K is incremented by the width, 6, of the band, and now equals 8; and P is incremented by the number of pixels to delete from each row of the band, 3, and now equals 3. When band B4 is processed, step 514 is executed in which K is incremented by the width, 1, of the band, and now equals 9. When band B5 is processed, step 534 is executed again in which K is incremented by the width, 6, of the band, and now equals 15; and P is incremented by the number of pixels to delete from each row of the band, 3, and now equals 6. When band B6 is processed, step 514 is executed again in which K is incremented by the width, 1, of the band, and now equals 16. When band B7 is processed, step 534 is executed again in which K is incremented by the width, 8, of the band, and now equals 24; and P is incremented by the number of pixels to delete from each row of the band, 4, and now equals 10.

When band B8 is processed, step 524 is executed again in which the width, 12, of the band is decremented by the number of columns to delete, 6, leaving six remaining columns. K is incremented by one half of these remaining columns, 3, and now equals 27. Then an entry E2 is generated in step 525 containing the accumulated number of columns to omit (OM=4) and keep (K=27), and the accumulated number of pixels subsequently to be deleted from each row of the corresponding subimage (P=10). Then another accumulation is begun with: OM is set equal to the number of columns to delete from the band, 6; K set equal to the difference of the width of the band (12) minus a value calculated as the sum of the columns to be omitted, 6, plus the remaining columns not accumulated in entry E1, 3; i.e. K=12−(6+3)=3; and P is set equal to zero.

When band B9 is processed, step 534 is executed again, in which K is incremented by the width, 6, of the band, and now equals 9; and P is incremented by the number of columns to delete from the band 3, and now equals 3. When band B10 is processed, step 522 is executed in which K is incremented by the width of the band, 6, less the number of columns to omit from the band, 3, which is equal to 3, and now equals 12. Then an entry E3 is generated in step 523 containing the accumulated number of columns to omit (OM=6) and keep (K=12), and the accumulated number of pixels subsequently to be deleted from each row of the corresponding subimage (P=3). Then another accumulation is begun with OM set equal to the number of columns to delete from the band, 3, K set equal to zero, and P set equal to zero.

Because there are no more bands to process, step 543 is processed in which an entry containing the final accumulation may be generated: E4: OM=3, K=0, and P=0. Because this entry corresponds to a null subimage, that subimage is simply discarded.

In a similar manner, a series of entries is generated by the process illustrated in FIG. 12 for the image illustrated in FIG. 10. The bands processed, the steps executed and the entries generated are:

B1-step 534, B2-steps 529,530,531—E1: OM=0, K=10, P=5 & E2: OM=2, K=4, P=0;

B3-step 534, B4-step 528, B5-step 534, B6-step 528, B7-step 534, B8-steps 529,530,531—E3: OM=2, K=22, P=10 & E4: OM=3, K=6, P=0;

B9-step 534, B10-steps 529,530,531—E5: OM=3, K=6, P=3 & E6: OM=2, K=3, P=0;

Step 543—E7: OM=1, K=0, P=0.

Also in a similar manner, a series of entries is generated by the process illustrated in FIG. 12 for the image illustrated in FIG. 11. The bands processed, the steps executed and the entries generated are:

B1-step 514, B2-step 538—E1: OM=0, K=6, P=3;

B3-step 514, step 543—E2: OM=1, K=11, P=6.

As described above, the data representing a subimage includes a source image array containing the data representing the image being divided, and subimage specification data including the location within the source image array of the subimage, the size of the subimage in rows and columns, the respective numbers of pixels yet to be deleted from the rows and columns of the subimage to produce the reduced image, and a location in a destination image array for the destination image. This data may be generated from the source image array, the image specification data of the parent image, and the list of entries E, described above. Referring again to FIG. 3, in step 216, the entries generated in step 214 are processed to generate the subimage specification data. The remaining process differs depending upon whether the image being divided is being divided into slices vertically or layers horizontally, as selected in step 204.

The following paragraphs describe the process for generating subimage specification data for parent images being divided vertically into slices. From the image specification data for the parent image, the left-hand column, right-hand column, top row and bottom row of the parent image in the source image array; and the left-hand column and top row in the destination image array for the reduced image to be produced from the parent image are known, or can be easily calculated For each entry E generated above, if any columns are to be omitted, i.e. if OM>zero, they are omitted from the-left-hand side. Thus, the left-hand column in the source image array of the first subimage, corresponding to the first entry E1, is set equal to the sum of the left-hand column in the source image array of the parent image plus the number of columns to omit, OM, in the first entry E1. In addition, the left hand column in the destination image array for the reduced image to be generated from this first subimage is set equal to the left hand column in the destination image array of the parent image.

The right-hand column in the source image array of the current subimage is set equal to sum of the newly set left-hand column in the source image array of this subimage, plus the number of columns to keep, K, in the current entry E. The number of pixels for this subimage subsequently to delete from each of its rows is set equal to the number of pixels (P) subsequently to be deleted from each row of the corresponding subimage in the current entry E.

The top row and bottom row in the source image array of the current subimage, and the number of pixels to be deleted from each column of this subimage are set to the top row, bottom row in the source image array, and number of pixels to be deleted from each column of the parent image, respectively. In addition, the top row in the destination image array for the reduced image to be generated from this subimage is set to the top row in the destination image array of the parent image. Then the edges of the newly specified subimage are tested to determine whether they are pinned (see FIG. 7, and the associated description) in a manner to be described in more.detail below.

Before processing the next entry, the initial left hand column in the source image array for the next subimage is calculated as the sum of the left hand column of the current subimage plus the number of columns to keep (K) in the current entry. In addition, the left hand column in the destination image array for the next subimage is calculated by incrementing the left hand column in the destination image array of the current subimage by the difference of the number of columns to keep (K) in the current subimage minus the number of pixels (P) subsequently to be deleted from each row of the current subimage. Then the next entry is processed. The remaining parameters of the next subimage are determined as described above. This continues until all entries have been processed.

The following paragraphs describe the process for generating subimages from parent images being divided horizontally into layers. For each entry E generated above, if any rows are to be omitted, i.e. if OM>zero, they are omitted from the top. Thus, the top row of the first subimage in the source image array, corresponding to the first entry E1, is set equal to the sum of the top row of the parent image in the source image array plus the number of rows to omit, OM, in the first entry E1. In addition, the top row in the destination image array for the reduced image to be generated from this first subimage is set equal to the top row in the destination image array of the parent image.

The bottom row of the current subimage in the source image array is set equal to the newly set top row of this subimage in the source image array, plus the number of rows to keep, K, in the current entry E. The number of pixels to delete from each column of the current subimage is set equal to the number of pixels P subsequently to be deleted from each column of the subimage in the current entry E.

The left-hand column and right-hand column in the source image array, and number of pixels to delete from each row of the current subimage are set to the left-hand column and right-hand column in the source image array, and number of pixels to delete from each row of the parent image, respectively. In addition, the left hand column in the destination image array of the reduced image to be generated from the current subimage is set to the left hand column in the destination image array of the parent image. Then the edges of the newly specified subimage are tested to determine whether they are pinned in a manner described below.

Before the next entry is processed, the top row in the source image array for the next subimage is set equal to the sum of the top row in the source image array of the current subimage plus the number of rows to keep (K) in the current entry. In addition, the top row in the destination image array for the next subimage is calculated by incrementing the top row in the destination image array of the current subimage by the difference of the number of rows to keep (K) in the current entry E minus the number of pixels (P) subsequently to be deleted from the current entry E. Then the next entry is processed. The remaining parameters of the next subimage are determined as described above. This continues until all entries have been processed.

In general, an end (meaning a top, bottom, left hand, or right hand) subimage inherits the parent's pin state for the edge forming that end. For example, the left edge of the leftmost subimage formed from a parent image being divided into slices vertically inherits the pinned state of the left edge of the parent image. Edges of subimages in the middle (i.e. not on an end, as described above) and parallel to the cut, will be evaluated to determine if they are pinned. If an edge perpendicular to the cut is unpinned on the parent image, then all of those edges are unpinned on the subimages. Otherwise, those edges must be reexamined on each subimage.

The following paragraphs describe the process for determining the pin states for each edge of subimages formed from parent images being divided vertically into slices. If the top edge of the parent image is not pinned, then the top edge of the subimage is set to not pinned. Otherwise, the pin state of the top edge of the subimage must be evaluated as follows. For each foreground top row pixel in the source image array, the three adjoining pixels in the row above are checked. If any of the adjoining pixels are also foreground pixels, then the top edge of the subimage is set to pinned, otherwise it is set to unpinned. If the bottom edge of the parent image is not pinned, then the bottom edge of the subimage is set to not pinned. Otherwise, the pin state of the bottom edge of the subimage must be evaluated as follows. For each foreground bottom row pixel in the source image array, the three adjoining pixels in the row below are checked. If any of the adjoining pixels are also foreground pixels, then the bottom edge of the subimage is set to pinned, otherwise it is set to unpinned.

If the first entry E1 (representing the leftmost subimage) is being processed, then the left edge pin state of the subimage is set to the left edge pin state of the parent image, otherwise, for each foreground left-hand pixel in the source image array (see e.g. pixel 25 of FIG. 7) the three adjoining pixels in the next column to the left are checked. If any of the adjoining pixels are also foreground pixels, then the left edge of the subimage is set to pinned, otherwise it is set to unpinned. If the last entry (representing the rightmost subimage) is being processed, then the right edge pin state of the subimage is set to the right edge pin state of the parent image, otherwise, for each foreground right-hand pixel in the source image array the three adjoining pixels in the next column to the right are checked. If any of the adjoining pixels are also foreground pixels (e.g. pixel 23d in FIG. 7), then the right edge of the subimage is set to pinned, otherwise it is set to unpinned.

The following paragraphs describe the process for determining the pin states for each edge of subimages formed from parent images being divided horizontally into layers. If the left edge of the parent image is not pinned, then the left edge of the subimage is set to not pinned. Otherwise, the pin state of the left edge of the subimage must be evaluated as follows. For each foreground left-hand column pixel in the source image array, the three adjoining pixels in the next column to the left are checked. If any of the adjoining pixels are also foreground pixels, then the left edge of the subimage is set to pinned, otherwise it is set to unpinned. If the right edge of the parent image is not pinned, then the right edge of the subimage is set to not pinned. Otherwise, the pin state of the right edge of the subimage must be evaluated as follows. For each foreground right-hand column pixel in the source image array, the three adjoining pixels in the next column to the right are checked. If any of the adjoining pixels are also foreground pixels, then the right edge of the subimage is set to pinned, otherwise it is set to unpinned.

If the first entry E1 (representing the topmost subimage) is being processed, then the top edge pin state of the subimage is set to the top edge pin state of the parent image, otherwise, for each foreground top pixel in the source image array the three adjoining pixels in the row above are checked. If any of the adjoining pixels are also foreground pixels, then the top edge of the subimage is set to pinned, otherwise it is set to unpinned. If the last entry (representing the bottommost subimage) is being processed, then the bottom edge pin state of the subimage is set to the bottom edge pin state of the parent image, otherwise, for each foreground bottom pixel in the source image array, the three adjoining pixels in the row below are checked. If any of the adjoining pixels are also foreground pixels, then the bottom edge of the subimage is set to pinned, otherwise it is set to unpinned.

The data representing the pin state of the top, bottom, left and right edges of the subimage are stored, as described above, along with the other image specification data for the subimage. This data is then used to determine whether that subimage must be divided into proportionately sized subimages, or whether there is greater freedom of choice for determining the sizes of subimages, as described above in steps 208, 210, and 214 (of FIG. 3). As described above, in general, an image being divided into slices vertically may be divided independently only when both its top and bottom edges are unpinned, and an image being divided into layers horizontally may be divided independently only when both its right hand and left hand edges are unpinned. Otherwise the image must be divided proportionately. When image specification data for the initial image is stored, all edges are set to unpinned, and the initial image is compressed as if it were an independent image. After the subimage specification data are all stored, e.g. pushed on the top of a stack, then the process of dividing the image into subimages ends in step 218. This completes the processing of step 118 (of FIG. 2).

In the foregoing discussion, pixels have preferentially been disproportionately deleted from solid white areas, as opposed to areas containing black pixels, whenever possible (i.e. whenever a foreground object would not be sheared). One skilled in the art will understand that, in accordance with the present invention, pixels may also be preferentially disproportionately deleted from solid black areas, as well. In addition, also in accordance with the present invention, when a color image is being compressed, pixels may preferentially be disproportionately deleted from areas which are any solid color. In either of these cases, if a background color can be assumed or identified, then in the illustrated embodiment, an edge will be deemed to be pinned if a non-background edge pixel is found to be adjacent to a non-background pixel on the other side of the edge. Alternatively, an edge of a subimage may be deemed to be pinned if a boundary between two colored areas crosses that edge of the subimage.

Figure 13:
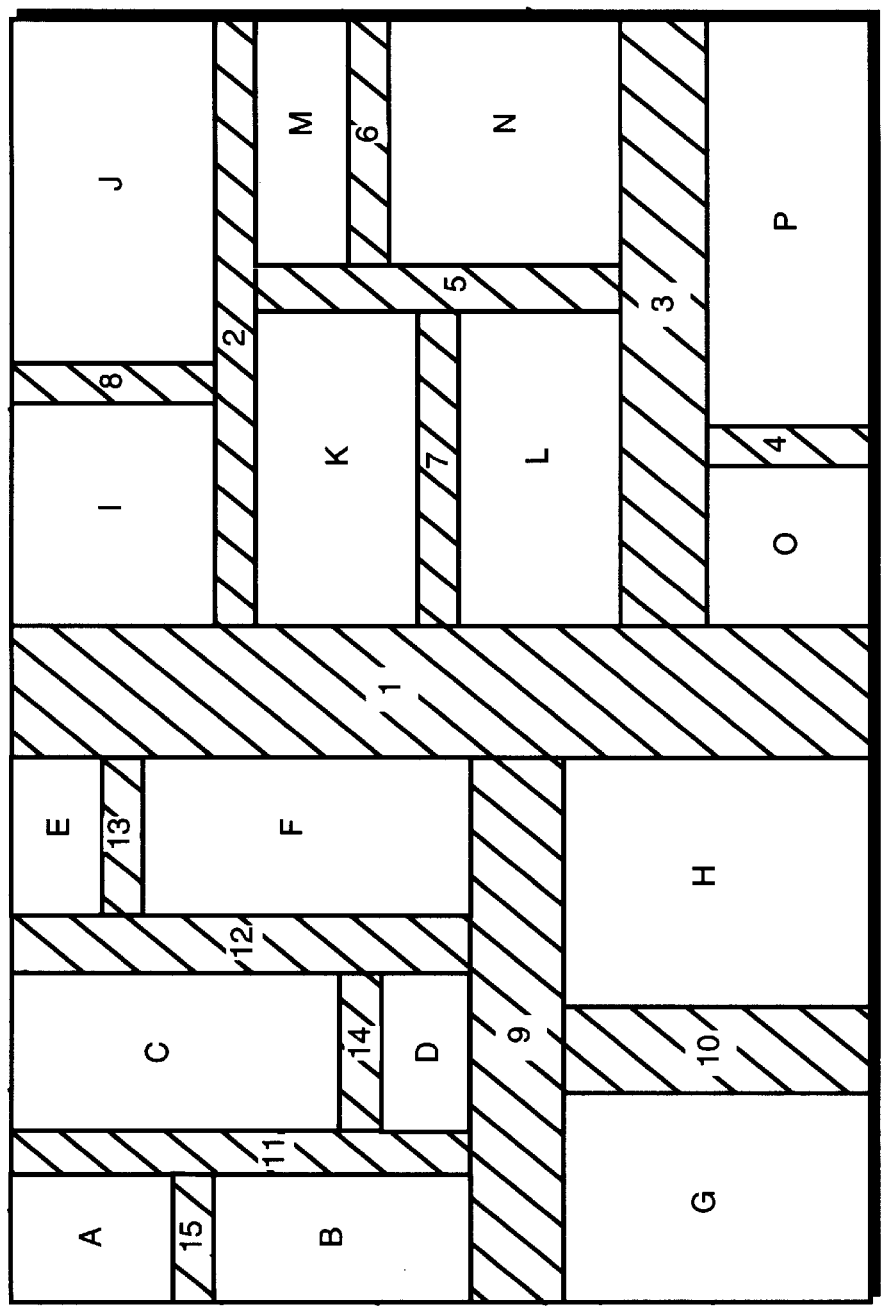
FIG. 13 and FIG. 14 are diagrams illustrating corresponding source and destination image arrays, respectively, illustrating the source image before, and the destination image after compression, according to the present invention.
Figure 14:
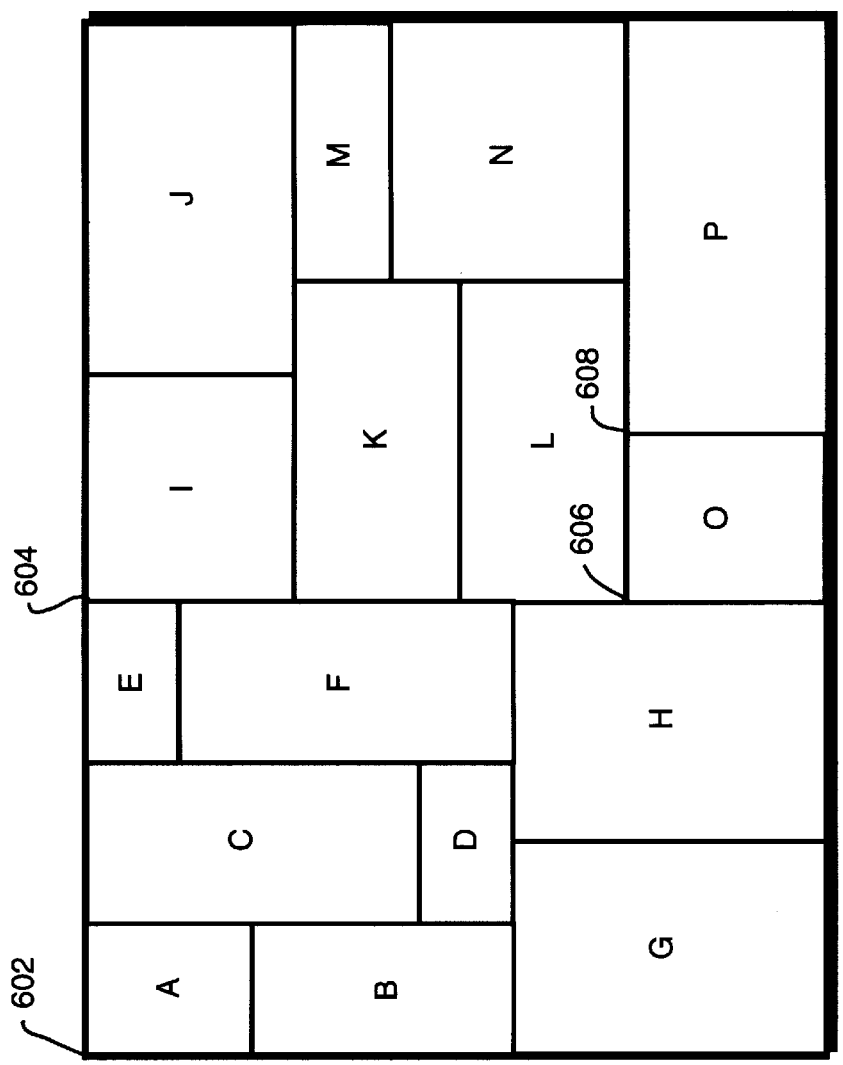

FIG. 13 and FIG. 14 are diagrams illustrating corresponding source and destination image arrays, illustrating the source image before, and the destination image after compression, respectively, according to the present invention. FIG. 13 and FIG. 14 should be jointly referred to in the following explanation. FIG. 13 illustrates a source image array having blank areas 1–15, illustrated as shaded, and occupied areas A–P, illustrated as white. When the image of FIG. 13 is processed according to the process described above, the following occurs. Image specification data representing the entire image (including occupied areas A–P and blank areas 1–15) and data specifying the upper left hand corner 602 in the destination image array of FIG. 14, is pushed onto a stack. In the following explanation, selected locations in the destination image array will be illustrated on FIG. 14 and described explicitly. It should be understood that each set of image specification data pushed on the stack includes such data.

The image specification data representing the entire image is then popped off the stack and processed according to the above process. The result is that blank area 1 is omitted from the image and two subimages are defined: the first containing occupied areas A–H and the second containing occupied areas I–P. Image specification data representing these respective subimages is pushed onto the stack in that order. The image specification data representing subimage I–P, including data specifying location 604 in the destination image array of FIG. 14, is then popped off the stack and processed according to the above process. The result of this process is that blank areas 2 and 3 are omitted and three subimages are defined: the first containing occupied areas I–J, the second containing areas K–N, and the third containing areas O–P. Image specification data representing these respective subimages is pushed onto the stack in that order.

The image specification data representing subimage O–P, including data specifying location 606 in the destination image array of FIG. 14, is then popped off the stack, and processed according to the above process. The result of this processing is that blank area 4 is omitted, and two subimages are defined: the first containing occupied area O and the second containing occupied area P. Image specification data representing these respective subimages is pushed on the stack. The data representing area P, including data specifying location 608 in the destination image array of FIG. 14, is popped off the stack. Because it represents a subimage of the correct size, data representing subimage P is emitted. This data may include the data from the source image array (of FIG. 13) representing the occupied area P, which may be then be transferred to the destination image array (of FIG. 14) at location 608. Similarly, the image specification data representing area O, including data specifying location 606 in the destination image array of FIG. 14, is then popped off the stack, and because it, too, represents a subimage of the correct size, data representing subimage O is emitted as described above.

The image specification data representing subimage K–N is then popped off the stack and processed according to the above process. The result of this processing is that blank area 5 is omitted and two subimages are defined: the first containing occupied areas K–L and the second containing occupied areas M–N. Image specification data representing these respective subimages is pushed onto the stack in that order. Image specification data representing subimage M–N is then popped off the stack and processed according to the above process. The result of that processing is that blank area 6 is omitted and two subimages are defined: the first consisting of the occupied area M and the second consisting of the occupied area N. Respective image specification data representing these subimages is pushed on the stack in that order.

The image specification data representing the subimage N is then popped off the stack. Because it represents a subimage of the correct size, data representing subimage N is emitted. Similarly, the image specification data representing area M is popped off the stack, and because it represents a subimage of the correct size, data representing subimage M is emitted. Then the image specification data representing subimage K–L is popped off the stack and processed according to the above process. The result of the process is that blank area 7 is omitted and two subimages are defined: the first consisting of occupied area K and the second consisting of occupied area L. Image specification data representing these respective subimages is pushed on the stack in that order. The image specification data representing the subimage L is popped off the stack. Because it represents a subimage of the correct size, data representing subimage L is emitted. Similarly, the image specification data representing subimage K is popped off the stack, and because it represents a subimage of the correct size, data representing subimage K is emitted.

Then the image specification data representing subimage I–J is popped off the stack and processed according to the above process. The result of the process is that blank area 8 is omitted and two subimages are defined: the first consisting of occupied area I and the second consisting of occupied area J. Image specification data representing these respective subimages is pushed on the stack in that order. The image specification data representing the subimage J is popped off the stack. Because it represents a subimage of the correct size, data representing subimage J is emitted. Similarly, the image specification data representing subimage I is popped off the stack, and because it represents a subimage of the correct size, the data representing subimage I is emitted.

The image specification data representing subimage A–H is then popped off the stack and processed according to the above processing. The result of this processing is that blank area 9 is omitted and two subimages are defined: the first containing occupied areas A–F and the second containing occupied areas G–H. Image specification data representing these respective subimages is pushed on the stack in that order. The image specification data representing the subimage G–H is then popped off the stack and processed according to the above process. The result of this processing is that blank area 10 is omitted and two subimages are defined: the first consisting of occupied areas G and the second consisting of occupied area H. Image specification data representing these respective subimages is pushed on the stack in that order. The image specification data representing the subimage H is popped off the stack. Because it represents a subimage of the correct size, data representing subimage H is emitted. Similarly, the image specification data representing area G is popped off the stack, and because it represents a subimage of the correct size, data representing subimage G is emitted.

The image specification data representing the subimage A–F is popped off the stack and processed according to the above processing. The result of this processing is that blank areas 11 and 12 are omitted and three subimages are defined: the first containing occupied areas A–B; the second containing occupied areas C–D; and the third containing occupied areas E–F. Image specification data representing the respective subimages is pushed on the stack in that order. The image specification data representing the subimage E–F is then popped off the stack and processed according to the above process. The result of this processing is that blank area 13 is omitted and two subimages are defined: the first consisting of occupied area E and the second consisting of occupied area F. Image specification data representing these respective subimages is pushed on the stack in that order. The image specification data representing the subimage F is popped off the stack. Because it represents a subimage of the correct size, data representing subimage F is emitted. Similarly, the image specification data representing area E is popped off the stack, and because it represents a subimage of the correct size, data representing subimage E is emitted.

The image specification data representing the subimage C–D is then popped off the stack and processed according to the above process. The result of this processing is that blank area 14 is omitted and two subimages are defined: the first consisting of occupied area C and the second consisting of occupied area D. Image specification data representing these respective subimages is pushed on the stack in that order. The image specification data representing the subimage D is popped off the stack. Because it represents a subimage of the correct size, data representing subimage D is emitted. Similarly, the image specification data representing area C is popped off the stack, and because it represents a subimage of the correct size, data representing subimage C is emitted.

The image specification data representing the subimage A–B is then popped off the stack and processed according to the above process. The result of this processing is that blank area 15 is omitted and two subimages are defined: the first consisting of occupied area A and the second consisting of occupied area B. Image specification data representing these respective subimages is pushed on the stack in that order. The image specification data representing the subimage B is popped off the stack. Because it represents a subimage of the correct size, data representing subimage B is emitted. Similarly, the image specification data representing area A is popped off the stack, and because it represents a subimage of the correct size, data representing subimage A is emitted. Because there are no more subimages to process, the above process is complete. The compressed image may be generated from the subimage data emitted by the above process.

FIG. 14 illustrates the compressed image formed from the full-sized image of FIG. 13 by the above processing. The blank areas, represented as shaded in FIG. 13, are deleted, and the remaining occupied areas A–P are fitted together to form the compressed image.

What is claimed is:

1. In a computer system, a method for reducing the size of an image, comprising the steps of:

receiving data representing an image, a size of the image, and a desired size of a corresponding compressed image;

determining if processing of the image is finished;

if the processing of the image is finished, emitting data representing the compressed image;

otherwise dividing the image into a plurality of subimages, each including data representing the subimage, a size of the subimage, and a desired size for a corresponding compressed subimage; and repeating the receiving, determining, and one of the emitting and dividing steps, for each subimage.

2. The method of claim 1 wherein:

the determining step comprises the steps of:

comparing the size of the image to the desired size of the compressed image; and if the size of the image is equal to the desired size of the compressed image, determining that the processing of the image is finished; and the emitting step comprises the step of, if the size of the image is equal to the desired size of the compressed image, emitting data representing the image as the compressed image.

3. The method of claim 1 wherein:

the determining step comprises the steps of:

determining if the image consists of a blank area;

if the image consists of a blank area, determining that the processing of the image is finished; and the emitting step comprises the step of, if the image consists of a blank area, deleting sufficient rows and columns from the image to produce the compressed image having the desired size.

4. The method of claim 1 wherein:
the determining step comprises the steps of:
  comparing the size of the image to a threshold size;
  if the size of the image is less than the threshold size, determining that the processing of the image is finished; and
the emitting step comprises the step of, if the size of the image is less than the threshold size, decimating the image to produce the compressed image having the desired size.

5. The method of claim 1 wherein the dividing step comprises the steps of:
  deciding whether to divide the image into slices vertically, or layers horizontally;
  generating a series of entries identifying portions of the image representative data respectively corresponding to the plurality of subimages;
  producing the data representing the plurality of subimages, the sizes of the plurality of subimages, and the desired sizes of the plurality of the corresponding compressed subimages, from the plurality of entries.

6. The method of claim 5 wherein:
the receiving step comprises the steps of:
  receiving the data representing the image comprising an image array of a plurality of rows and columns of pixels, each pixel being one of a foreground and a background pixel; and
  receiving the data representing the desired size of the compressed image comprising respective numbers of pixels to delete from each row and column of the image; and
the deciding step comprises the steps of:
  determining the aspect ratio of the image;
  generating a vertical profile of the image, comprising the respective numbers of foreground pixels in each column of the image;
  generating a horizontal profile of the image, comprising the respective numbers of foreground pixels in each row of the image;
  determining the width of the widest blank slice in the image from the vertical profile, and the height of the tallest blank layer in the image from the horizontal profile; and
  deciding whether to divide the image into one of slices vertically and layers horizontally based on: the respective numbers of pixels to delete from each row and column of the image, the aspect ratio of the image, the width of the widest blank slice in the image, and the height of the tallest blank layer in the image.

7. The method of claim 5 wherein:
the receiving step comprises the steps of:
  receiving the data representing the image comprising an array of a plurality of rows and columns of pixels, each pixel being one of a foreground and a background pixel; and
  receiving the data representing the desired size of the compressed image comprising respective numbers of pixels to delete from each row and column of the image; and
the deciding step comprises the steps of:
  generating a vertical profile of the image; and
  generating a horizontal profile of the image; and
the generating step comprises the step of generating the series of entries in response to: a profile consisting of one of the vertical profile, if it was decided to divide the image into slices vertically, and the horizontal profile, if it was decided to divide the image into layers horizontally; and a number of deletions consisting of one of the number of pixels to delete from each row, if it was decided to divide the image into slices vertically and the number of pixels to delete from each column, if it was decided to divide the image into layers horizontally.

8. The method of claim 7, wherein the generating step further comprises the steps of:
  dividing the image into a series of alternating blank and occupied bands by traversing the profile;
  allocating a weight to each band;
  apportioning the number of deletions among the series of bands based on the weights of the respective bands;
  composing the series of entries, each entry corresponding to a respective subimage and comprising data representing a number of strips to omit from the image to form the corresponding subimage, a number of strips to keep to form the corresponding subimage, the strips being one of columns, if it was decided to divide the image into slices vertically, and rows if it was decided to divide the image into layers horizontally, and a number of deletions subsequently to be deleted from the corresponding subimage.

9. The method of claim 8 wherein:
the dividing step comprises the step of determining a starting point, an ending point, and a type, being one of blank and occupied, for each one of the series of bands, from a first band to a last band; and
the allocating step comprises:
  determining whether the image is to be compressed proportionately or independently;
  if the image is to be compressed proportionately, allocating a weight to each one of the bands substantially proportional to the width of the one of the bands, the width being equal to the difference of the ending point minus the starting point of the one of the bands; and
  if the image is to be compressed independently, allocating a weight to each one of the bands substantially proportional to:
    if the type of the one of the bands is occupied, the width of the one of the bands;
    if the type of the one of the bands is blank, and the one of the bands is the first band in the series of bands or is the last band in the series of bands, a first constant, greater than one, times the width of the one of the bands;
    otherwise, a second constant, greater than the first constant, times the width of the one of the bands.

10. The method of claim 9 wherein the second constant is twice the first constant.

11. The method of claim 9 wherein the first constant is one and one-half, and the second constant is three.

12. The method of claim 9 wherein:
the receiving step further receives respective data indicating whether a foreground object extends from within the image past any of the top, bottom, right-hand and left-hand edges of the image; and
the generating step further comprises the steps of:
  if it was decided to divide the image into slices vertically, and a foreground object extended past either one of the top and bottom edges of the image, then generating data indicating that the image is to be compressed proportionately;

if it was decided to divide the image into layers horizontally, and a foreground object extended past either one of the left-hand and right-hand edges of the image, then generating data indicating that the image is to be compressed proportionately;

otherwise generating data indicating that the image is to be compressed independently.

13. The method of claim 8 wherein the apportioning step comprises the steps of:

calculating respective ideal apportionments of the deletions to each one of the series of bands equal to the product of the number of deletions times the quotient of the weight of the one of the bands divided by the sum of the weights of all of the bands;

making respective initial apportionments of the deletions to each one of the series of bands equal to the nearest integral number to the ideal apportionment for the one of the bands;

if the sum of the initial apportionments to all of the bands is less than the number of deletions, then:

calculating respective proposed apportionments for each of the bands by incrementing the respective apportionments;

determining respective percent excesses of the proposed apportionments over the corresponding ideal apportionments for each of the bands;

identifying the one of the bands having the lowest percent excess of proposed apportionment over the ideal apportionment;

incrementing the apportionment of the identified band; and repeating the calculating, determining, identifying and incrementing steps until the sum of the apportionments to all of the bands equals the number of deletions; and if the sum of the initial apportionments to all of the bands is greater than the number of deletions, then:

calculating respective proposed apportionments for each of the bands by decrementing the respective apportionments;

determining respective percent deficiencies of the proposed apportionments from the corresponding ideal apportionments for each of the bands;

identifying the one of the bands having the lowest percent deficiency of proposed apportionment from the ideal apportionment;

decrementing the apportionment of the identified band; and repeating the calculating, determining, identifying and decrementing steps until the sum of the apportionments to all of the bands equals the number of deletions.

14. The method of claim 8 wherein the composing step comprises the steps of:

initializing data for representing the next entry;

traversing the series of bands in order from a first band to a last band, and for each one of the series of bands:

if the one of the bands is occupied, accumulating next entry representative data corresponding to the occupied band;

if the one of the bands is blank, and the image is to be compressed independently, then performing one of the following steps:

if no deletions are apportioned to the one of the bands, accumulating next entry representative data corresponding to the blank band;

if deletions are apportioned to the one of the bands and the one of the bands is the first band, accumulating next entry representative data for deleting a number of strips equal to the deletions apportioned to the one of the bands from the beginning of the one of the bands;

if deletions are apportioned to the one of the bands and the one of the bands is the last band, accumulating next entry representative data for deleting a number of strips equal to the deletions apportioned to the one of the bands from the end of the one of the bands;

otherwise accumulating next entry representative data for deleting a number of strips equal to the deletions apportioned to the one of the bands from the middle of the one of the bands;

if the one of the bands is blank, and the image is to be compressed proportionally, then performing one of the following steps:

if no deletions are apportioned to the one of the bands, accumulating next entry representative data corresponding to the blank band;

otherwise accumulating next entry representative data to delete a number of strips equal to the deletions apportioned to the one of the bands from the sides of the one of the bands.

15. The method of claim 14 wherein, the initializing step comprises the step of setting data representing the number of strips to omit, the number of strips to keep and the number of deletions subsequently to be deleted in the next entry representative data all to zero.

16. The method of claim 14 wherein, the step of accumulating next entry representative data corresponding to an occupied band comprises the step of incrementing the number of strips to keep in the next entry representative data by a width of the one of the bands, and incrementing the number of deletions subsequently to be deleted in the next entry representative data by the number of deletions apportioned to the one of the bands.

17. The method of claim 14 wherein, the steps of accumulating next entry representative data corresponding to a blank band to which no deletions are apportioned comprises the step of incrementing the number of strips to keep in the next entry representative data by the width of the one of the bands.

18. The method of claim 14 wherein, the step of accumulating next entry representative data corresponding to a blank band, to which deletions have been apportioned and which is the first band in an image to be compressed independently comprises the step of incrementing the number of strips to omit in the next entry representative data by the number of deletions apportioned to the one of the bands, and incrementing the number of strips to keep in the next entry representative data by the difference of the width of the one of the bands minus the number of deletions apportioned to the one of the bands.

19. The method of claim 14 wherein, the step of accumulating next entry representative data corresponding to a blank band, to which deletions have been apportioned and which is the last band in an image to be compressed independently comprises the steps of:

incrementing the number of strips to keep in the next entry representative data by the difference of the width of the one of the bands minus the number of deletions apportioned to the one of the bands;

emitting a next entry in the series of entries containing the next entry representative data; and setting the number of strips to omit in the next entry representative data to the difference of the width of the one of the bands minus the number of deletions apportioned to the one of the bands, and setting the number of strips to keep and the number of deletions subsequently to be deleted in the next entry representative data both to zero.

20. The method of claim 14 wherein, the step of accumulating next entry representative data corresponding to a blank band, to which deletions have been apportioned and which is neither the first band nor the last band in an image to be compressed independently comprises the steps of:

calculating a first integer representing one-half of the difference of the width of the one of the bands minus the number of deletions apportioned to the one of the bands;

incrementing the number of strips to keep in the next entry representative data by the first integer;

emitting a next entry in the series of entries containing the next entry representative data; and setting the number of strips to omit in the next entry representative data to the number of deletions apportioned to the one of the bands, setting the number of strips to keep in the next entry representative data to the difference of the width of the one of the bands minus the sum of the first integer plus the number of deletions apportioned to the one of the bands, and setting the number of deletions subsequently to be deleted in the next entry representative data to zero.

21. The method of claim 14 wherein, the step of accumulating next entry representative data corresponding to a blank band, to which deletions have been apportioned in an image to be compressed proportionately comprises the steps of:

emitting a next entry in the series of entries containing the next entry representative data;

setting the number of strips to omit in the next entry representative data to a second integer representing one-half the number of deletions apportioned to the one of the bands, setting the number of strips to keep in the next entry representative data to the difference between the width of the one of the bands minus the number of deletions apportioned to the one of the bands and setting the number of strips to be subsequently deleted in the next entry representative data to zero;

emitting a next entry in the series of entries containing the next entry representative data; and setting the number of strips to omit in the next entry representative data to the difference between the width of the one of the bands minus the sum of the second integer and the number of deletions apportioned to the one of the bands, and setting the number of strips to keep and the number of deletions subsequently to be deleted in the next entry representative data both to zero.

22. The method of claim 14 wherein:

the generating step further comprises, after the apportioning step, the steps of:

determining whether any deletions have been apportioned to blank bands; and if no deletions have been apportioned to blank bands, identifying one occupied band as a cut band; and the composing step further comprises, as a part of the traversing step, the steps of:

if the one of the bands is the cut band, selecting a strip to delete; and accumulating next entry representative data for deleting the selected strip from the cut band.

23. The method of claim 22 wherein the step of identifying a cut band comprises the step of selecting a widest occupied band as the cut band.

24. The method of claim 22 wherein the step of selecting a strip in the cut band to delete comprises the step of processing the profile to select a strip in the cut band having relatively few foreground pixels and relatively close to the center of the one of the bands as a cut strip.

25. The method of claim 24 wherein the step of processing the profile to select a cut strip comprises the steps of:

calculating a middle of the cut band equal to the average of a starting strip and an ending strip of the cut band; and for each entry in the profile, representing a strip in the cut band:

calculating a distance of the represented strip from the middle; and calculating the sum of the distance plus the number of foreground pixels; and selecting the strip with the minimum sum as the cut strip.

26. The method of claim 22 wherein the step of accumulating next entry representative data for deleting the selected strip from the cut band comprises the steps of:

calculating a first integer representing the number of strips preceding the cut strip in the cut band;

calculating a second integer representing the number of strips following the cut strip in the cut band;

calculating a first integer proportion of deletions equal to the product of the difference of the number of deletions apportioned to the cut band minus one times the quotient of the first integer divided by the width of the one of the bands;

calculating a second integer proportion equal to the difference of the number of deletions apportioned to the cut band minus the sum of the first integer proportion plus one;

incrementing the number of strips to keep in the next entry representative data by the first integer and incrementing the number of deletions subsequently to be deleted in the next entry representative data by the first integer proportion;

emitting a next entry in the series of entries containing the next entry representative data;

setting the number of strips to omit in the next entry representative data to one, setting the number of strips to keep in the next entry representative data to the second integer and setting the number of deletions subsequently to be deleted in the next entry representative data to the second proportion.

27. The method of claim 26 wherein the step of accumulating next entry representative data for deleting the selected strip from the cut band further comprises, before the first calculating step, the steps of:

if the width of the cut band is equal to one:

emitting a next entry in the series of entries containing the next entry representative data; and setting the number of strips to omit in the next entry representative data to one, and setting the number of strips to keep and the number of deletions subsequently to be deleted in the next entry representative data both to zero.

28. The method of claim 14 wherein the composing step further includes, after the traversing step, the step of emitting a next entry in the series of entries containing the next entry representative data.

29. The method of claim 8 wherein:
the receiving step further comprises the step of receiving data representing the image comprising a left-hand column, a right-hand column, a top row and a bottom row of the image in the image array; and
the producing step comprises the steps of:
if it was decided to divide the image into slices vertically:
setting a current left-hand column to the left-hand column of the image;
traversing the entries, and for each one of the entries:
calculating a left-hand column of the subimage corresponding to the one of the entries equal to the sum of the current left-hand column plus the number of strips to omit in the one of the entries;
calculating a right-hand column of the subimage corresponding to the one of the entries equal to the sum of the left-hand column of the subimage plus the number of strips to keep in the one of the entries;
setting the number of pixels subsequently to delete from each row of the subimage corresponding to the one of the entries to the number of deletions subsequently to be deleted in the one of the entries;
setting the top row of the subimage corresponding to the one of the entries to the top row of the image;
setting the bottom row of the subimage corresponding to the one of the entries to the bottom row of the image;
setting the number of pixels subsequently to delete from each column of the subimage corresponding to the one of the entries to the number of pixels subsequently to delete from each column of the image;
producing the right-hand column, the left-hand column, the top row and the bottom row of the subimage corresponding to the one of the entries as the data representing the subimage and the size of the subimage, and the number of pixels to delete from each column and the number of pixels to delete from each row of the subimage corresponding to the one of the entries as the data representing the desired size of the compressed subimage; and
setting the current left-hand column to the sum of the left-hand column of the subimage corresponding to the one of the entries plus the number of strips to keep in the one of the entries; and
if it was decided to divide the image into layers horizontally:
setting a current top row to the top row of the image;
traversing the entries, and for each one of the entries:
calculating a top row of the subimage corresponding to the one of the entries equal to the sum of the current top row plus the number of strips to omit in the one of the entries;
calculating a bottom row of the subimage corresponding to the one of the entries equal to the sum of the top row of the subimage corresponding to the one of the entries plus the number of strips to keep in the one of the entries;

setting the number of pixels to delete from each column of the subimage corresponding to the one of the entries to the number of strips to be subsequently deleted in the one of the entries;
setting the left-hand column of the subimage corresponding to the one of the entries to the left-hand column of the image;
setting the right-hand column of the subimage corresponding to the one of the entries to the right-hand column of the image;
setting the number of pixels to delete from each column of the subimage to the number of pixels to delete from each column of the image;
producing the right-hand column, the left-hand column, the top row and the bottom row of the subimage as the data representing the subimage and the size of the subimage, and the number of pixels to delete from each column of the subimage and the number of pixels to delete from each row of the subimage as the data representing the desired size of the compressed subimage;
setting the current top row to the sum of the top row of the subimage corresponding to the one of the entries plus the number of strips to keep in the one of the entries.

30. The method of claim 29 wherein:
the receiving step further includes the step of receiving data representing the image further comprising a destination top row and a destination left-hand column in a destination image array for the compressed image; and
the producing step further comprises the steps of:
if it was decided to divide the image into slices vertically:
before the traversing step, setting a current destination left-hand column to the destination left-hand column of the image;
in the producing step of traversing step, further producing the current destination left-hand column as the destination left-hand column of the subimage, and the destination top row of the image as the destination top row of the subimage; and
after the producing step of the traversing step, updating the current destination left-hand column by incrementing the current left-hand column by the difference of the number of strips to keep in the one of the entries minus the number of pixels subsequently to be deleted from each row of the subimage corresponding to the one of the entries; and
if it was decided to divide the image into layers horizontally:
before the traversing step, setting a current destination top row to the destination top row of the image;
in the producing step of traversing step, further producing the current destination top row as the destination top row of the subimage, and the destination left-hand column of the image as the destination left-hand column of the subimage; and
after the producing step of the traversing step, updating the current destination top row by incrementing the current top row by the difference of the number of strips to keep in the one of the entries minus the number of pixels subsequently to be deleted from each column of the subimage corresponding to the one of the entries.

31. The method of claim 29 wherein:

the receiving step further comprises the step of receiving respective edge pin data for the respective top, bottom, right-hand and left-hand edges of the image, each of the pin data having a pinned state when a foreground object extends from within the image past the top, bottom, right-hand and left-hand edges of the image, respectively, and an unpinned state otherwise; and the producing step further comprises the steps of:

if it was decided to divide the image into slices vertically:

traversing the entries from a first entry to a last entry, and for each one of the entries:

if the top edge pin data for the image has the unpinned state, setting the top edge pin data of the subimage corresponding to the one of the entries to the unpinned state, otherwise if a foreground object extends from within the subimage corresponding to the one of the entries past the top edge of the subimage corresponding to the one of the entries, setting the top edge pin data to the pinned state, otherwise setting the top edge pin data to the unpinned state;

if the bottom edge pin data for the image has the unpinned state, setting the bottom edge pin data of the subimage corresponding to the one of the entries to the unpinned state, determining if a foreground object extends from within the subimage corresponding to the one of the entries past the bottom edge of the subimage corresponding to the one of the entries, setting the bottom edge pin data to the pinned state, otherwise setting the bottom edge pin data to the unpinned state;

if the entry is the first entry, setting the left-hand edge pin data of the subimage corresponding to the one of the entries to the left-hand edge pin data of the image, otherwise if a foreground object extends from within the subimage corresponding to the one of the entries past the left-hand edge of the subimage corresponding to the one of the entries, setting the left-hand edge pin data to the pinned state, otherwise setting the left-hand edge pin data to the unpinned state; and if the entry is the last entry, setting the right-hand edge pin data of the subimage corresponding to the one of the entries to the right-hand edge pin data of the image, otherwise if a foreground object extends from within the subimage corresponding to the one of the entries past the right-hand edge of the subimage corresponding to the one of the entries, setting the right-hand edge pin data to the pinned state, otherwise setting the right-hand edge pin data to the unpinned state; and if it was decided to divide the image into layers horizontally:

if the left-hand edge pin data for the image has the unpinned state, setting the left-hand edge pin data of the subimage corresponding to the one of the entries to the unpinned state, otherwise if a foreground object extends from within the subimage corresponding to the one of the entries past the left-hand edge of the subimage corresponding to the one of the entries, setting the left-hand edge pin data to the pinned state, otherwise setting the left-hand edge pin data to the unpinned state;

if the right-hand edge pin data for the image has the unpinned state, setting the right-hand edge pin data of the subimage corresponding to the one of the entries to the unpinned state, otherwise if a foreground object extends from within the subimage corresponding to the one of the entries past the right-hand edge of the subimage corresponding to the one of the entries, setting the right-hand edge pin data to the pinned state, otherwise setting the right-hand edge pin data to the unpinned state;

if the entry is the first entry, setting the top edge pin data of the subimage corresponding to the one of the entries to the top edge pin data of the image, otherwise if a foreground object extends from within the subimage corresponding to the one of the entries past the top edge of the subimage corresponding to the one of the entries, setting the top edge pin data to the pinned state, otherwise setting the top edge pin data to the unpinned state;

if the entry is the last entry, setting the bottom edge pin data of the subimage corresponding to the one of the entries to the bottom edge pin data of the image, otherwise if a foreground object extends from within the subimage corresponding to the one of the entries past the bottom edge of the subimage corresponding to the one of the entries, setting the bottom edge pin data to the pinned state, otherwise setting the bottom edge pin data to the unpinned state.

32. The method of claim 31 wherein the steps of determining if a foreground object extends from within the subimage corresponding to the one of the entries past the top edge of the subimage corresponding to the one of the entries comprises the step of, for each foreground pixel in the top row of the subimage, determining if any of the three adjoining pixels in the row above are foreground pixels, and if so, determining that a foreground object extends from within the subimage corresponding to the one of the entries past the top edge of the subimage corresponding to the one of the entries.

33. The method of claim 31 wherein the steps of determining if a foreground object extends from within the subimage corresponding to the one of the entries past the bottom edge of the subimage corresponding to the one of the entries comprises the step of, for each foreground pixel in the bottom row of the subimage, determining if any of the three adjoining pixels in the row below are foreground pixels, and if so, determining that a foreground object extends from within the subimage corresponding to the one of the entries past the bottom edge of the subimage corresponding to the one of the entries.

34. The method of claim 31 wherein the steps of determining if a foreground object extends from within the subimage corresponding to the one of the entries past the left-hand edge of the subimage corresponding to the one of the entries comprises the step of, for each foreground pixel in the left-hand column of the subimage, determining if any of the three adjoining pixels in the next column to the left are foreground pixels, and if so, determining that a foreground object extends from within the subimage corresponding to the one of the entries past the left-hand edge of the subimage corresponding to the one of the entries.

35. The method of claim 31 wherein the steps of determining if a foreground object extends from within the subimage corresponding to the one of the entries past the right-hand edge of the subimage corresponding to the one of the entries comprises the step of, for each foreground pixel in the right-hand column of the subimage, determining if any of the three adjoining pixels in the next column to the right are foreground pixels, and if so, determining that a foreground object extends from within the subimage corresponding to the one of the entries past the right-hand edge of the subimage corresponding to the one of the entries.

* * * * *